US012804636B2

(12) United States Patent
Sun et al.

(10) Patent No.: US 12,804,636 B2
(45) **Date of Patent: *Nov. 17, 2026**

(54) SINGLE DOWNLINK CONTROL INFORMATION (DCI) MULTI-TRANSMISSION AND RECEIPT POINT (MULTI-TRP) TIME DIVISION MULTIPLEXING (TDM) ENHANCEMENT

(71) Applicant: Apple Inc., Cupertino, CA (US)

(72) Inventors: Haitong Sun, Cupertino, CA (US); Yushu Zhang, Beijing (CN); Wei Zeng, Saratoga, CA (US); Dawei Zhang, Saratoga, CA (US); Yuchul Kim, San Jose, CA (US); Hong He, San Jose, CA (US); Weidong Yang, San Diego, CA (US); Chunxuan Ye, San Diego, CA (US); Chunhai Yao, Beijing (CN); Oghenekome Oteri, San Diego, CA (US); Jie Cui, San Jose, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/768,092

(22) Filed: Jul. 10, 2024

(65) Prior Publication Data

US 2025/0097933 A1 Mar. 20, 2025

Related U.S. Application Data

(63) Continuation of application No. 17/442,037, filed as application No. PCT/CN2020/074954 on Feb. 12, 2020, now Pat. No. 12,063,641.

(51) Int. Cl.
*H04W 72/1263* (2023.01)
*H04W 72/044* (2023.01)
(Continued)

(52) U.S. Cl.
CPC ... *H04W 72/1263* (2013.01); *H04W 72/0446* (2013.01); *H04W 72/046* (2013.01); *H04W 72/20* (2023.01)

(58) Field of Classification Search
CPC ............. H04W 72/1263; H04W 72/20; H04W 72/0446; H04W 72/046; H04W 72/1268;
(Continued)

(56) References Cited

U.S. PATENT DOCUMENTS 12,063,641 B2 8/2024 Sun et al.
2019/0174466 A1 6/2019 Zhang et al.
(Continued)

FOREIGN PATENT DOCUMENTS

CN 110167040 8/2019
CN 110677228 1/2020
(Continued)

OTHER PUBLICATIONS

CATT, "Considerations on multi-TRP/panel transmission," 3GPP TSG RAN WG1, Meeting #98, R1-1910349, Chongqing, China, Oct. 14-20, 2019, 25 pages.
(Continued)

*Primary Examiner* — Mewale A Ambaye
(74) *Attorney, Agent, or Firm* — Fish & Richardson P.C.

(57) ABSTRACT

In an example method, a user equipment (UE) device determines an offset length of time associated with transmitting or receiving data over a wireless network. The UE device transmits an indication of the offset length of time to the wireless network. The UE device transmits or receives, during a first time interval, a first portion of data to or from the wireless network though a first wireless link. The UE device transmits or receives, during a second time interval, a second portion of data to or from the wireless network though a second wireless link. An end of first time interval
(Continued)

is offset from a beginning of the second time interval by the offset length of time.

15 Claims, 18 Drawing Sheets

(51) Int. Cl.
*H04W 72/0446* (2023.01)
*H04W 72/20* (2023.01)

(58) Field of Classification Search
CPC ............... H04W 8/20; H04W 36/0072; H04W 72/0453; H04W 16/28; H04W 2/04; H04W 4/12; H04B 7/0695; H04B 7/088
See application file for complete search history.

(56) References Cited

U.S. PATENT DOCUMENTS

| | | | |
|---|---|---|---|
| 2020/0336181 | A1 | 10/2020 | Cao et al. |
| 2021/0037484 | A1 | 2/2021 | Zhou et al. |
| 2021/0068113 | A1 | 3/2021 | Tang |
| 2021/0184824 | A1 | 6/2021 | Kwak et al. |
| 2021/0297114 | A1 | 9/2021 | Zhang et al. |
| 2021/0321442 | A1 | 10/2021 | Jung et al. |
| 2021/0337568 | A1* | 10/2021 | Xu ...................... H04L 25/0224 |
| 2022/0150930 | A1 | 5/2022 | Song et al. |
| 2022/0201709 | A1 | 6/2022 | Zhang et al. |
| 2022/0210679 | A1* | 6/2022 | Cirik ..................... H04W 24/08 |
| 2022/0225369 | A1* | 7/2022 | Park ................... H04B 7/06952 |
| 2023/0209647 | A1 | 6/2023 | Khoshkholgh Dashtaki et al. |
| 2023/0217434 | A1 | 7/2023 | Cirik et al. |
| 2023/0217442 | A1 | 7/2023 | Jang et al. |
| 2023/0254851 | A1 | 8/2023 | Prasad et al. |

FOREIGN PATENT DOCUMENTS

| | | |
|---|---|---|
| CN | 110710231 | 1/2020 |
| CN | 111800239 | 10/2020 |
| EP | 4007419 | 6/2022 |
| WO | WO 2018/127487 | 7/2018 |
| WO | WO 2019/061347 | 4/2019 |
| WO | WO 2019/061350 | 4/2019 |
| WO | WO 2019/137441 | 7/2019 |
| WO | WO 2020/017918 | 1/2020 |

OTHER PUBLICATIONS

CATT, "Remaining issues on multi-TRP/panel transmission," 3GPP TSG RAN WG1, Meeting #99, R1-1912176, Reno, Nevada, Nov. 18-22, 2019, 22 pages.

Ericsson et al., "Discussion on the time offset and frequency shift in FeICIC demodulation," 3GPP TSG-RAN WG4 Meeting #66, R4-130564, Malta, Malta, Jan. 26-Feb. 2, 2013, 5 pages.

Ericsson, "Finalizing issues for mTRP," 3GPP TSG-RAN WG1, Meeting #99, R1-1912656, Reno, Nevada, Nov. 18-22, 2019, 16 pages.

Intel Corporation, "On multi-TRP/multi-panel transmission," 3GPP TSG RAN WG1, Meeting #97, R1-1908653, Prague, Czechoslovakia, Aug. 26-30, 2019, 24 pages.

Intel Corporation, "Considerations on multi-TRP/panel transmission," 3GPP TSG RAN WG1, Meeting #98, R1-1910668, Chongqing, China, Oct. 14-20, 2019, 15 pages.

International Preliminary Report on Patentability in International Appln. No. PCT/CN2020/074954, mailed on Aug. 25, 2022, 6 pages.

International Search Report and Written Opinion in International Appln. No. PCT/CN2020/074954, mailed on Nov. 17, 2020, 8 pages.

Huawei et al., "Enhancements on multi-TRP/panel transmission," 3GPP TSG RAN WG1 Meeting #94bis, R1-1810104, Chengdu, China, Oct. 8-12, 2018, 17 pages.

Huawei et al., "Enhancements on multi-TRP/panel transmission," 3GPP TSG RAN WG1 Meeting #99, R1-1911902, Reno, USA, Nov. 18-22, 2019, 16 pages.

Intel Corporation, "On multi-TRP/multi-panel transmission," 3GPP TSG RAN WG1, Meeting #97, R1-1907559, Reno, Nevada, May 13-17, 2019, 21 pages.

* cited by examiner

SINGLE DOWNLINK CONTROL INFORMATION (DCI) MULTI-TRANSMISSION AND RECEIPT POINT (MULTI-TRP) TIME DIVISION MULTIPLEXING (TDM) ENHANCEMENT

CROSS-REFERENCE TO RELATED APPLICATION

This application is a continuation application of and claims priority to U.S. application Ser. No. 17/442,037, filed Sep. 22, 2021, which is the U.S. National Phase Application under 35 U.S.C. § 371 of International Patent Application No. PCT/CN2020/074954 filed Feb. 12, 2020, the entire contents of which are hereby incorporated by reference. The International Application was published on Aug. 19, 2021 as WO 2021/159354 A1 under PCT article 21 (3).

TECHNICAL FIELD

The present application relates to wireless devices, and more particularly to apparatus, systems, and methods for a wireless device to establish and maintain concurrent connections with current radio access technologies and next generation radio access technologies.

BACKGROUND

Wireless communication systems are rapidly growing in usage. Further, wireless communication technology has evolved from voice-only communications to also include the transmission of data, such as Internet and multimedia content. Thus, improvements in the field are desired.

SUMMARY

In an aspect, a method includes determining, by a user equipment (UE) device, an offset length of time associated with transmitting or receiving data over a wireless network; transmitting, by the UE device, an indication of the offset length of time to the wireless network; transmitting or receiving, by the UE device during a first time interval, a first portion of data to or from the wireless network though a first wireless link; and transmitting or receiving, by the UE device during a second time interval, a second portion of data to or from the wireless network though a second wireless link. An end of first time interval is offset from a beginning of the second time interval by the offset length of time.

Implementation of this aspect can include one or more of the following features.

In some implementations, the first portion of data can be identical to the second portion of data.

In some implementations, the first portion of data can correspond to a first physical downlink shared channel (PDSCH), and the second portion of data can correspond to a second PDSCH.

In some implementations, the first wireless link can correspond to a first beam generated by first antenna array of the UE device, and the second wireless link can correspond to a second beam generated by the first antenna array.

In some implementations, the first wireless link can correspond to a first beam generated by first antenna array of the UE device, and the second wireless link can correspond to a second beam generated by a second antenna array of the UE device.

In some implementations, the first portion of data and the second portion of data can be are transmitted within a same slot with respect to a time domain.

In some implementations, the first portion of data and the second portion of data can be transmitted during different respective slots with respect to a time domain.

In some implementations, the offset length of time can be expressed as a number of network transmission symbols.

In some implementations, the offset length of time can be expressed in a unit of time.

In some implementations, the determining the offset length of time can include selecting the offset length of time from a plurality of candidate offset lengths of time.

In some implementations, the offset length of time can be determined based on one or more characteristics of the first wireless link and the second wireless link.

In some implementations, the offset length of time can be determined based on a determination that the first wireless link and the second wireless link are associated with a common logical grouping with respect to one or more antenna arrays of the UE device.

In some implementations, the offset length of time can be determined based on a determination that the first wireless link and the second wireless link are associated with different respective logical groupings with respect to one or more antenna arrays of the UE device.

In some implementations, the method can further include, subsequent to transmitting or receiving the second portion of data, modifying, by the UE device, the offset length of time; transmitting, by the UE device, an indication of the modified offset length of time to the wireless network; transmitting or receiving, by the UE device during a third time interval, a third portion of data to or from the wireless network though a third wireless link; and transmitting or receiving, by the UE device during a fourth time interval, a fourth portion of data to or from the wireless network though a fourth wireless link. An end of third time interval can be offset from a beginning of the fourth time interval by at least the modified offset length of time.

In some implementations, the method can further include determining, by the UE device, a second offset length of time associated with receiving data over the wireless network; transmitting, by the UE device, an indication of the second offset length of time to the wireless network; receiving, by the UE device during a third time interval, a third portion of data to the wireless network though a third wireless link; and receiving, by the UE device during a fourth time interval, a fourth portion of data to the wireless network though a fourth wireless link. An end of third time interval can be offset from a beginning of the fourth time interval by at least the second offset length of time.

In another aspect, a method includes receiving, by a base station from a user equipment (UE) device over a wireless network, an indication of the offset length of time associated with transmitting or receiving data over the wireless network; transmitting or receiving, by the base station during a first time interval, a first portion of data to or from the UE device over the wireless network though a first wireless link; and transmitting or receiving, by the base station during a second time interval, a second portion of data to or from the UE device over the wireless network though a second wireless link. An end of first time interval is offset from a beginning of the second time interval by the offset length of time.

Implementations of this aspect can include one or more of the following features.

In some implementations, the first portion of data can be identical to the second portion of data.

In some implementations, the first portion of data can correspond to a first physical downlink shared channel (PDSCH), and the second portion of data corresponds to a second PDSCH.

In some implementations, the first wireless link can correspond to a first beam generated by first antenna array of the UE device, and the second wireless link can correspond to a second beam generated by the first antenna array.

In some implementations, the first wireless link can correspond to a first beam generated by first antenna array of the UE device, and the second wireless link can correspond to a second beam generated by a second antenna array of the UE device.

In some implementations, the first portion of data and the second portion of data can be transmitted within a same slot with respect to a time domain.

In some implementations, the first portion of data and the second portion of data can be transmitted during different respective slots with respect to a time domain.

In some implementations, the offset length of time can be expressed as a number of network transmission symbols.

In some implementations, the offset length of time can be expressed in a unit of time.

In some implementations, the UE device can determine the offset length of time by selecting the offset length of time from a plurality of candidate offset lengths of time.

In some implementations, the UE device can determine the offset length of time based on one or more characteristics of the first wireless link and the second wireless link.

In some implementations, the UE device can determine the offset length of time based on a determination that the first wireless link and the second wireless link are associated with a common logical grouping with respect to one or more antenna arrays of the UE device.

In some implementations, the UE device can determine the offset length of time based on a determination that the first wireless link and the second wireless link are associated with different respective logical groupings with respect to one or more antenna arrays of the UE device.

In some implementations, the method can further include, subsequent to transmitting or receiving the second portion of data, receiving, by the base station from the UE device, an indication of a modified offset length of time; transmitting or receiving, by the base station during a third time interval, a third portion of data to or from the UE device over the wireless network though a third wireless link; and transmitting or receiving, by the base station during a fourth time interval, a fourth portion of data to or from the UE device over the wireless network though a fourth wireless link. An end of third time interval can be offset from a beginning of the fourth time interval by at least the modified offset length of time.

In some implementations, the method can further include receiving, by the station from the UE device, an indication of a second offset length of time associated with receiving data over the wireless network; receiving, by the base station during a third time interval, a third portion of data from the UE device over the wireless network though a third wireless link; and receiving, by the base station during a fourth time interval, a fourth portion of data from the UE device from the wireless network though a fourth wireless link. An end of third time interval can be offset from a beginning of the fourth time interval by at least the second offset length of time.

In another aspect, a method includes receiving, by a user equipment (UE) device from a wireless network, control information indicating a scheduling of at least one of a transmission of data to the wireless network or a receipt of data from the wireless network. The transmission or the receipt of data includes a transmission or receipt of a first portion of data according to a first beam, and a transmission or receipt of a second portion of data according to a second beam. The method also includes determining, by the UE device, that the scheduling exceeds a capability of the UE device; and responsive to determining that the scheduling exceeds a capability of the UE device, performing at least one of: transmitting, by the UE device, data to the wireless network according to a modified scheduling, or receiving, by the UE device, data from the wireless network according to the modified scheduling.

Implementation of this aspect can include one or more of the following features.

In some implementations, the control information can include an indication that the first portion of data is to be transmitted during a first time interval and the second portion of data is to be transmitted during a second time interval. An end of first time interval can be offset from a beginning of the second time interval by the offset length of time. Determining that the scheduling exceeds the capability of the UE device can include determining that the offset length of time is less than a minimum offset length of time associated with the UE device.

In some implementations, the control information can include an indication that the first portion of data is to be received during a first time interval and the second portion of data is to be received during a second time interval. An end of first time interval can be offset from a beginning of the second time interval by the offset length of time. Determining that the scheduling exceeds the capability of the UE device can include determining that the offset length of time is less than a minimum offset length of time associated with the UE device.

In some implementations, transmitting data to the wireless network according to the modified scheduling can include transmitting the first portion of the data to the wireless network in accordance with the scheduling indicated by the control data, and not transmitting the second portion of data to the wireless network.

In some implementations, receiving data from the wireless network according to the modified scheduling can include receiving the first portion of the data from the wireless network in accordance with the scheduling indicated by the control data, and not receiving the second portion of data from the wireless network.

In some implementations, transmitting data to the wireless network according to the modified scheduling can include transmitting the first portion of data and the second portion of data according to a common beam. In some implementations, the common beam can be selected based on at least one of: a control resource set (CORESET) having a lowest logical index from among a plurality of CORESETs configured for use with respect to the wireless network, a CORESET most recently used by the UE device to monitor for transmission from the wireless network, or an active transmission configuration indicator (TCI) state having a lowest logical index from among a plurality of TCI states of the UE device.

In some implementations, receiving data from the wireless network according to the modified scheduling can include receiving the first portion of data and the second portion of data according to a common beam. In some implementations, the common beam can be selected based on at least one of: a control resource set (CORESET) having a lowest logical index from another a plurality of CORESETs configured for use by the wireless network, a CORESET most recently used by the UE device to monitor for transmission from the wireless network, or an active transmission configuration indicator (TCI) state having a lowest logical index from among a plurality of TCI states of the UE device.

In some implementations, the first portion of data can correspond to a first physical downlink shared channel (PDSCH), and the second portion of data can correspond to a second PDSCH.

In another aspect, a method includes transmitting, by a base station to a user equipment (UE) device over a wireless network, control information indicating a scheduling of at least one of a transmission of data to the wireless network or a receipt of data from the wireless network. The transmission or the receipt of data includes a transmission or receipt of a first portion of data according to a first beam, and a transmission or receipt of a second portion of data according to a second beam, The method also include responsive to the UE device determining the scheduling exceeds a capability of the UE device, performing at least one of: transmitting, by the base station, data to the UE device over the wireless network according to a modified scheduling, or receiving, by the base station, data to the UE device over the wireless network according to the modified scheduling.

Implementations of this aspect can include one or more of the following features.

In some implementations, the control information can include an indication that the first portion of data is to be transmitted during a first time interval and the second portion of data is to be transmitted during a second time interval, where an end of first time interval is offset from a beginning of the second time interval by the offset length of time. The UE device can determine that the scheduling exceeds the capability of the UE device by determining that the offset length of time is less than a minimum offset length of time associated with the UE device.

In some implementations, the control information can include an indication that the first portion of data is to be received during a first time interval and the second portion of data is to be received during a second time interval, where an end of first time interval is offset from a beginning of the second time interval by the offset length of time. The UE device can determine that the scheduling exceeds the capability of the UE device by determining that the offset length of time is less than a minimum offset length of time associated with the UE device.

In some implementations, the first portion of data can correspond to a first physical downlink shared channel (PDSCH), and the second portion of data can correspond to a second PDSCH.

In another aspect, a method includes initiating transmission, from a first network device to a second network device, of a sequence of data over a wireless network according to a network schedule. According to the network schedule, a portion of data is to be periodically transmitted multiple times. The method also includes receiving, by the first network device from the second network device, an indication to terminate the transmission of the sequence of data; and responsive to receiving the indication, terminating, by the first network device, the transmission of the sequence of data to the second network device.

Implementation of this aspect can include one or more of the following features.

In some implementations, terminating the transmission of the sequence of data can include terminating the periodic transmission of the portion of data.

In some implementations, the indication can be received via a physical uplink control channel (PUCCH).

In some implementations, the indication can be received via a physical channel configured to indicate a successful reception of data over the wireless network.

In some implementations, the indication can be received via downlink control information (DCI) transmitted by the second network device.

In another aspect, a method includes determining, by a user equipment (UE) device, that data is to be transmitted to a wireless network according to a first transmission scheme. According to the first transmission scheme, a first instance of the data and a second instance of the data are to be transmitted within a first slot with respect to a time domain, and the first instance of the data is identical to the second instance of the data. The method also includes determining, by the UE device, that the first instance of the data and the second instance of the data cannot be fully transmitted within the first slot; and responsive to determining that the first instance of the data and the second instance of the data cannot be fully transmitted within the first slot, transmitting the first instance of the data and the second instance of data according to a modified transmission scheme.

Implementation of this aspect can include one or more of the following features.

In some implementations, determining that the first instance of the data and the second instance of the data cannot be fully transmitted within the first slot can include determining that the transmission of the first instance of the data and the second instance of the data would exceed a length of time of the first slot.

In some implementations, transmitting the first instance of the data and the second instance of data according to the modified transmission scheme can include transmitting only the first instance of the data during the first slot.

In some implementations, transmitting the first instance of the data and the second instance of data according to the modified transmission scheme can include transmitting the first instance of the data during the first slot; and transmitting the second instance of the data during the first slot and a second slot with respect to the time domain immediately subsequent to the first slot.

In some implementations, transmitting the first instance of the data and the second instance of data according to the modified transmission scheme can include transmitting the first instance of the data during the first slot; truncating the second instance of the data; and transmitting the truncated second instance of the data during the first slot.

In another aspect, a method includes determining, by a user equipment (UE) device, that data is to be received from a wireless network according to a first transmission scheme. According to the first transmission scheme, a first instance of the data and a second instance of the data are to be received within a first slot with respect to a time domain, and the first instance of the data is identical to the second instance of the data. The method further includes determining, by the UE device, that the first instance of the data and the second instance of the data cannot be fully received within the first slot; and responsive to determining that the first instance of the data and the second instance of the data cannot be fully received within the first slot, receiving the first instance of the data and the second instance of data according to a modified receipt scheme.

Implementation of this aspect can include one or more of the following features.

In some implementations, determining that the first instance of the data and the second instance of the data cannot be fully received within the first slot can include determining that the receipt of the first instance of the data and the second instance of the data would exceed a length of time of the first slot.

In some implementations, receiving the first instance of the data and the second instance of data according to the modified transmission scheme can include receiving only the first instance of the data during the first slot.

In some implementations, receiving the first instance of the data and the second instance of data according to the modified transmission scheme can include receiving the first instance of the data during the first slot; and receiving the second instance of the data during the first slot and a second slot with respect to the time domain immediately subsequent to the first slot.

In another aspect, a method includes receiving, by a user equipment (UE) device, control information regarding a transmission of data to a wireless network. The control information includes an indication of a number of transmission configuration indication (TCI) states associated with the transmission, an indication of a number of code division multiplexing (CDM) groups associated with the transmission, and an indication of a transmission scheme associated with the transmission. The transmission scheme is one of: a first transmission scheme in which the data is transmitted multiple times within a same slot with respect to a time domain, or a second transmission scheme in which the data is transmitted multiple times during different respective slots with respect to the time domain. The method further includes determining, by the UE device based on the control information, that the data is to be transmitted according to the transmission scheme and according to a dynamic point selection (DPS) configuration; and transmitting or receiving the data according to the transmission scheme and according to the DPS configuration.

Implementation of this aspect can include one or more of the following features.

In some implementations, transmitting or receiving the data according to the transmission scheme and according to the DPS configuration can include selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

In some implementations, the control information can indicate that the first transmission scheme, one TCI state, and one or more CDM groups are associated with the transmission. The UE device can determine, based on the control information, that the data is to be transmitted or received according to the first transmission scheme and according to the DPS configuration.

In some implementations, the control information can further include an indication of a number of repetitions by which to transmit the data, the number of repetitions being equal to one. The UE device can determine, based on the control information, that the data is to be transmitted or received according to the first transmission scheme and according to the DPS configuration.

In some implementations, the control information can indicate that the second transmission scheme, one TCI state, and one or more CDM groups are associated with the transmission. The UE device can determine, based on the control information, that the data is to be transmitted or received according to the second transmission scheme and according to the DPS configuration.

In some implementations, the control information can further include an indication of a number of repetitions by which to transmit the data, the number of repetitions being greater than one. The UE device can determine, based on the control information, that the data is to be transmitted or received according to the second transmission scheme and according to the DPS configuration.

In another aspect, a method includes transmitting, from a base station to a user equipment (UE) device, control information regarding a transmission of data to a wireless network. The control information includes an indication of a number of transmission configuration indication (TCI) states associated with the transmission, an indication of a number of code division multiplexing (CDM) groups associated with the transmission, and an indication of a transmission scheme associated with the transmission. The transmission scheme is one of: a first transmission scheme in which the data is transmitted multiple times within a same slot with respect to a time domain, or a second transmission scheme in which the data is transmitted multiple times during different respective slots with respect to the time domain.

The method also includes receiving, at the base station from the UE device over the wireless network, or transmitting, from the base station to the UE device over the wireless work, data according to a transmission scheme and according to a dynamic point selection (DPS) configuration.

Implementation of this aspect can include one or more of the following features.

In some implementations, transmitting or receiving the data according to the transmission scheme and according to the DPS configuration can include selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

In some implementations, the control information can indicate that the first transmission scheme, one TCI state, and one or more CDM groups are associated with the transmission. The UE device can determine, based on the control information, that the data is to be transmitted or received according to the first transmission scheme and according to the DPS configuration.

In some implementations, the control information can further include an indication of a number of repetitions by which to transmit the data, the number of repetitions being equal to one. The UE device can determine, based on the control information, that the data is to be transmitted or received according to the first transmission scheme and according to the DPS configuration.

In some implementations, the control information can indicate that the second transmission scheme, one TCI state, and one or more CDM groups are associated with the transmission. The UE device can determine, based on the control information, that the data is to be transmitted or received according to the second transmission scheme and according to the DPS configuration.

In some implementations, the control information can further include an indication of a number of repetitions by which to transmit the data, the number of repetitions being greater than one. The UE device can determine, based on the control information, that the data is to be transmitted or received according to the second transmission scheme and according to the DPS configuration.

Other implementations are directed to systems, devices and non-transitory, computer-readable mediums comprising instructions for performing the techniques described herein.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
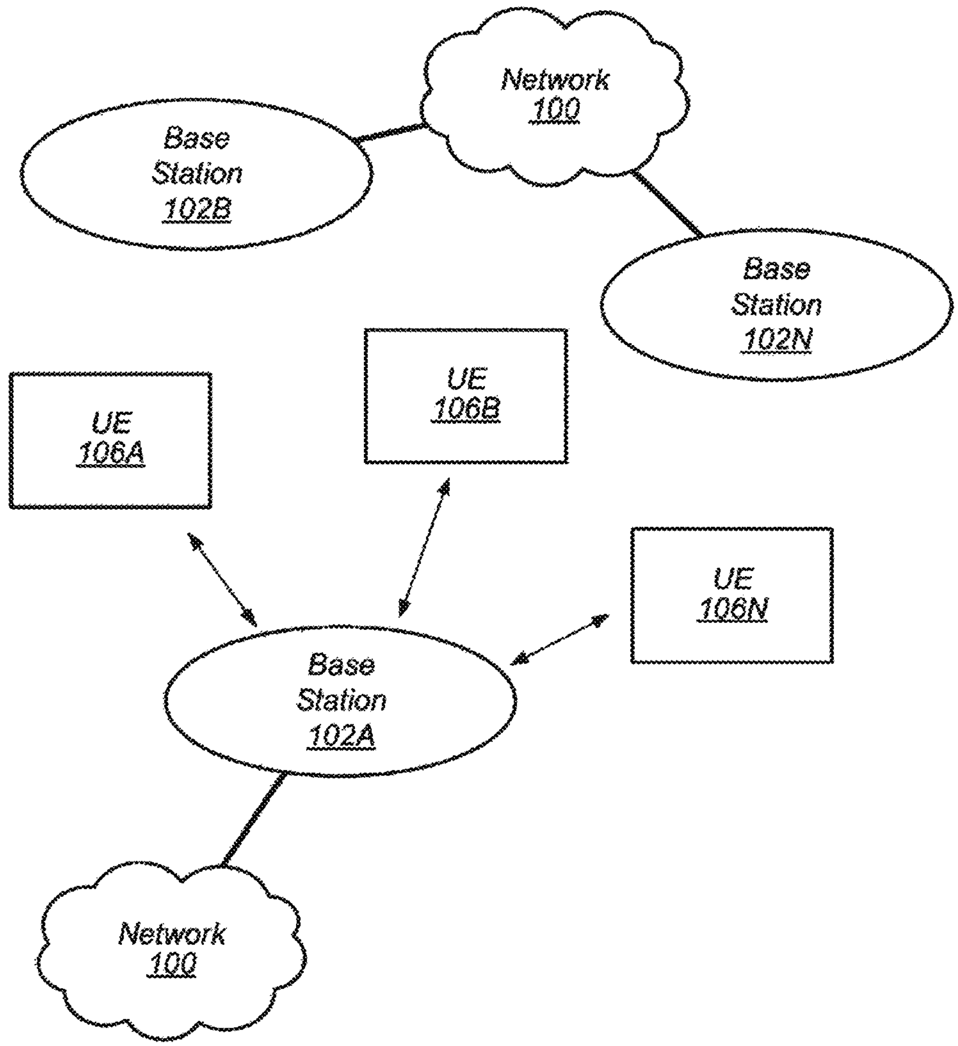
FIG. 1 illustrates an example wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limited to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

Example Communication System

FIG. 1 illustrates a simplified example wireless communication system. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
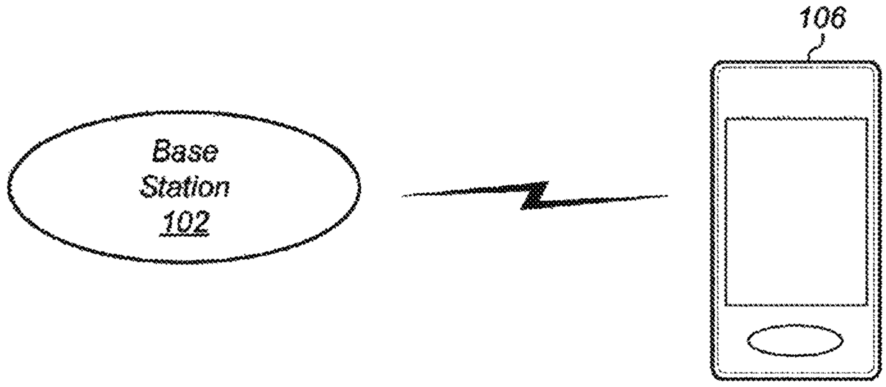
FIG. 2 illustrates a base station (BS) in communication with a user equipment (UE) device.

FIG. 2 illustrates user equipment 106 (e.g., one of the devices 106A through 106N) in communication with a base station 102. The UE 106 may be a device with cellular communication capability such as a mobile phone, a handheld device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Example User Equipment

Figure 3:
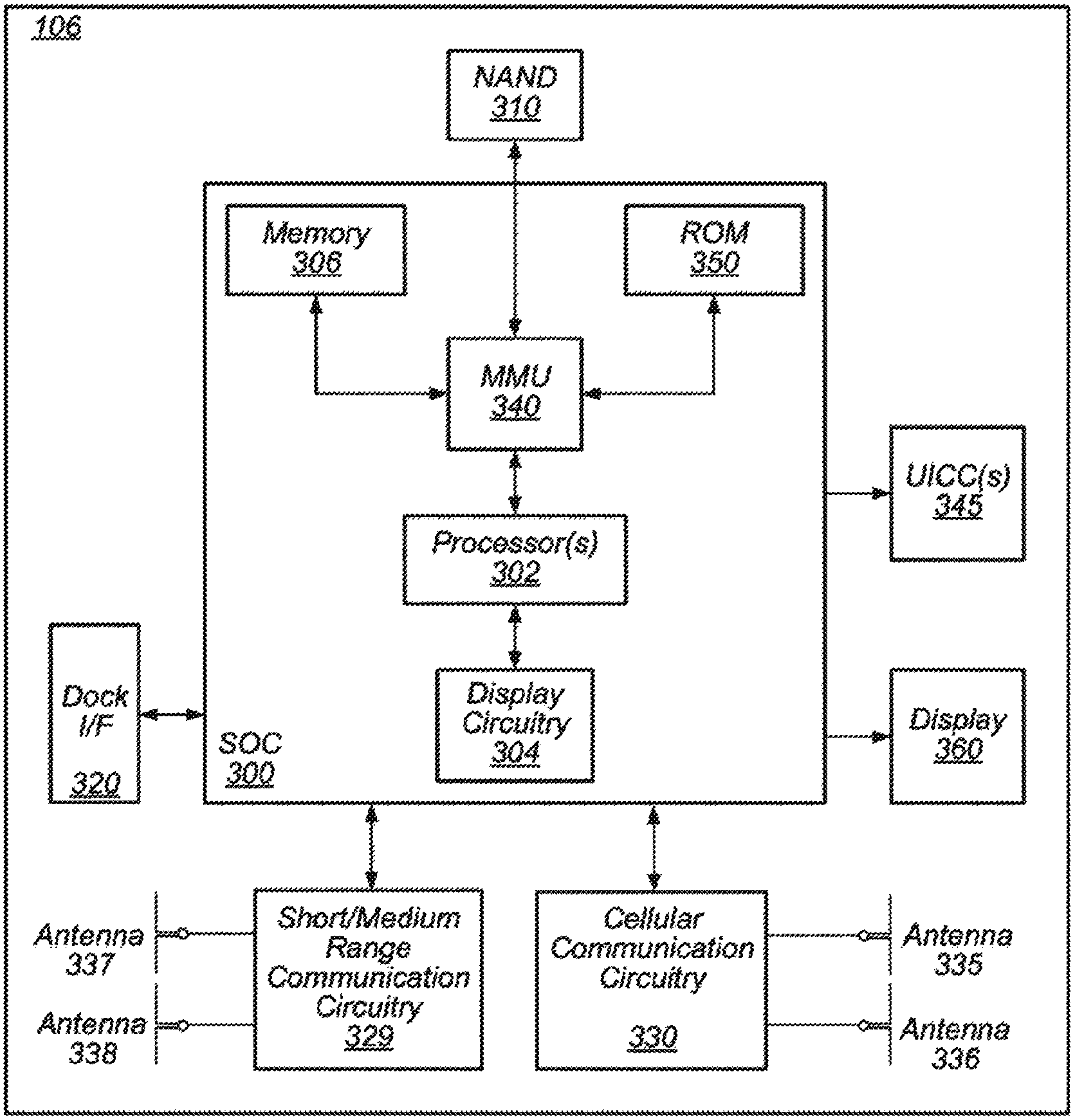
FIG. 3 illustrates an example block diagram of a UE.

FIG. 3 illustrates an example simplified block diagram of a communication device 106. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

The communication device 106 may include hardware and software components for implementing the features described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Example Base Station

Figure 4:
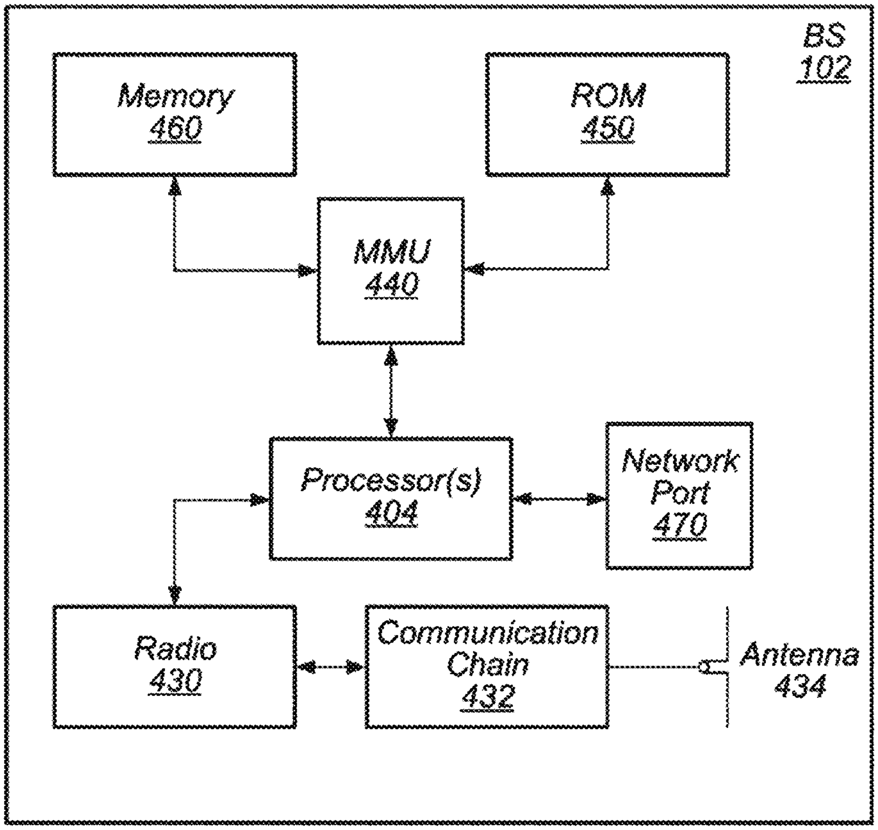
FIG. 4 illustrates an example block diagram of a BS.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the base station 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the station 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
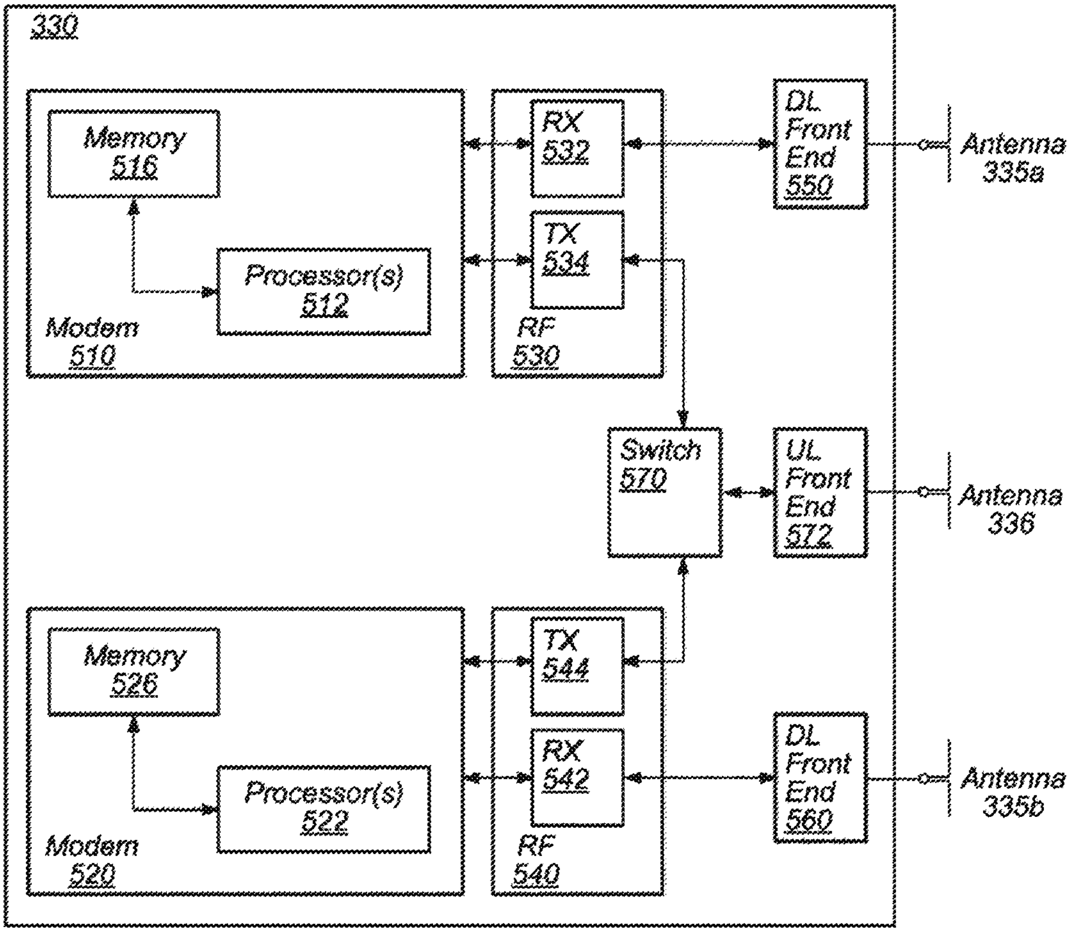
FIG. 5 illustrates an example block diagram of cellular communication circuitry.

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335 *a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335 *b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

The modem 510 may include hardware and software components for implementing the above features described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

The modem 520 may include hardware and software components for implementing the features described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Reporting Switch Delay Time by a User Equipment Device

In some embodiments, a UE device 106 can communicate with one or more base stations 102 according to a multi-transmission and receipt point (multi-TRP) communication protocol. For example, each base station of a wireless network can include one or more TRPs (e.g., one or more antennas or antenna arrays), and a UE device can connect to multiple different TRPs sequentially or concurrently (e.g., in the same base station or in different base stations) to transmit data and/or receive data over the wireless network. This can be beneficial, for example, in enabling the UE device 106 to communicate quickly and reliably to the wireless network under a range of different conditions (e.g., by mitigating the effects of path loss or signal attenuation associated with communicating with each TRP individually).

In some embodiments, a UE device 106 and each of the base stations 102 can coordinate the transmission and/or receipt of data according to a particular schedule. For example, the schedule can specify that data to transmitted between an UE device and particular TRPs of the base stations at specific times and using specific allotments of network resources (e.g., specific frequency domain and/or time domain resource allocation slots). In some embodiments, scheduling information can be exchanged between a UE device and a base station in the form of downlink control information (DCI) messages transmitted over a control channel between the UE device and the base station (e.g., a physical downlink control channel, PDCCH). In some embodiments, a single DCI message can contain scheduling information that enables a UE device to schedule the transmission and/or receipt of data to and from multiple TRPs. This may be referred to as a single DCI multi-TRP communications protocol.

In some embodiments, a device (e.g., a base station 102) can transmit the same data to another device (e.g., a UE device 106) multiple times in repetition. As an example, a device can transmit the same data two, three, four, or more times over a period of time (e.g., according to a periodic schedule). This can be beneficial, for example, in improving the fidelity of the transmission.

In some embodiments, the same data can be transmitted multiple different times, but each instance of the transmitted data can encoded according to different encoding schemes. As an example, a first device can encode a particular portion of data (e.g., a data packet) according to a first encoding scheme, and transmit the encoded data to a second device. Further, the first device can encode the portion of data according to a second encoding scheme, and transmit the differently encoded data to the second device. Accordingly, the same underlying data is transmitted to the second device (e.g., "identical" instances of data are transmitted between the devices). However, the actual signals that are transmitted between the devices may differ, due to the use of different encoding schemes.

In some embodiments, a device can transmit the same data to another UE device multiple times within the same slot (e.g., the same frequency domain and/or time resource allocation slot). This may be referred to as intra-slot repetition or "Scheme 3" according to 5G New Radio (5G NR) standards. Each instance of data (e.g., PDSCH or PUSCH data) can have the same length or time duration in the slot. Further, sequential instances of data can be separated from one another by a particular offset length of time. In some embodiments, the offset length of time can be signaled by a radio resource control (RRC) parameter (e.g., "StartingSymbolOffsetK"). The offset length of time can be signaled in units of time (e.g., milliseconds) or in number of symbols.

In some embodiments, a device can transmit the same data to another device multiple times within different respective slots (e.g., one instance of the data is included in each of several frequency domain and/or time domain resource allocation slots). This may be referred to as inter-slot repetition or "Scheme 4" according to 5G NR standards. In some embodiments, each instance of the data can be transmitted according to the same time domain resource allocation (TDRA) in each slot (e.g., according to the same start and length indicator value, SLIV). In some embodiments, the number of repetitions can be signaled in the DCI. For example, the number of repetitions can be signaled in the TDRA of a DCI via an "URLLCRepNum" parameter.

Figure 6A:
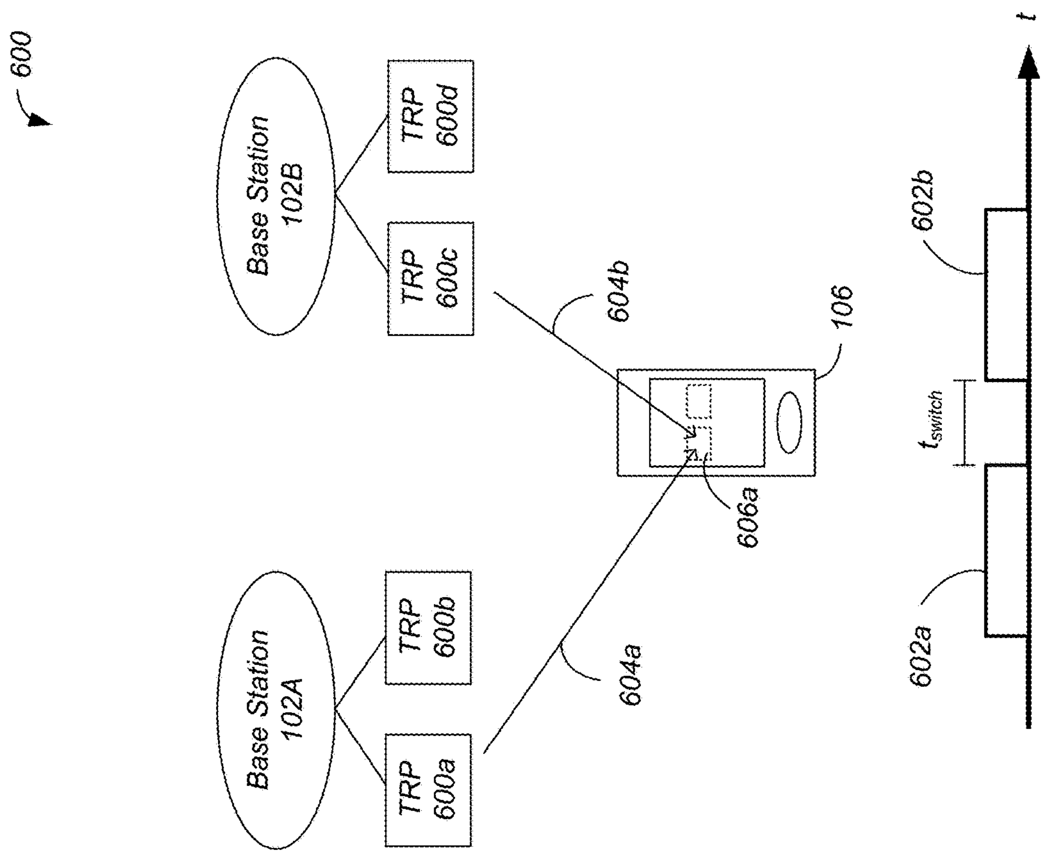
FIGS. 6A and 6B illustrate example systems for transmitting data according to multi-TRP transmission protocol.

An example system 600 for transmitting data according to a multi-TRP transmission protocol is shown in FIG. 6A. The system 600 includes a UE device 106 and two base stations 102A and 102B. The base station 102A includes two TRPs 600*a* and 600*b* (e.g., two different antennas or antenna arrays). The base station 102B includes two TRPs 600*c* and 600*d* (e.g., two different antennas or antenna arrays). Although FIG. 6A shows two base stations having two TRPs each, this is merely an illustrative example. In practice, there may be any number of base stations, each having any number of TRPs.

In the example shown in FIG. 6A, the base station 102A transmits a first instance of data 602*a* to the UE device 106 using the TRP 600*a*. For instance, the base station 102A can form a beam 604*a* directed towards the UE device 106 using the TRP 600*a* (e.g., a directional or spatially "shaped" beam formed by patterns of constructive and destructive interference of radio signals emitted by the TRP 600*a*), and transmit the first instance of data 602*a* using the beam 604*a*. The UE device receives the first instance of data 602*a* by activating a first antenna array 606*a*, measuring the properties of the beam 604*a* using the first antenna array 606*a*, and decoding the first instance of data 602*a* from the measurements.

Subsequently, the base station 102B transmits a second instance of data 602*b* to the UE device 106 using the TRP 600*c*. For instance, the base station 102B can form a beam 604*b* directed towards the UE device 106 using the TRP 600*c* (e.g., a directional or spatially "shaped" beam formed by patterns of constructive and destructive interference of radio signals emitted by the TRP 600*c*), and transmit the second instance of data 602*b* using the beam 604*b*. The UE device receives the second instance of data 602*b* by measuring the properties of the beam 604*b* using the first antenna array 606*a*, and decoding the second instance of data 602*b* from the measurements.

As described above, the first and second instances of data 602*a* and 602*b* can be identical (e.g., to improve the fidelity of the data transmission). As an example, the first and the second instance of data 602*a* and 602*b* can include the same data (e.g., a data packet) that has been encoded according to the same encoding scheme. As another example, the first and the second instance of data 602*a* and 602*b* can include the same data that has been encoded according to different respective encoding schemes (e.g., such that the underlying data are identical, albeit encoded according to different encoding schemes). Further, the scheduling of data transmissions can be specified using DCI messages transmitted between the base stations and the UE device.

As shown in FIG. 6A, the transmission of the first instance of data 602*a* and the transmission of the second instance of data 602*b* are offset by a switch delay time $t_{switch}$. The switch delay time $t_{switch}$ can be selected based on the capabilities of the UE device 106 and/or the capabilities of the TRPs with which it communicates. In some embodiments, the switch delay time $t_{switch}$ can be selected based on the amount of time that is needed for the UE device 106 to switch from measuring the properties of one beam (e.g., the beam 604*a*) to measuring the properties of another beam (e.g., the beam 604*b*) using the same antenna array (e.g., the antenna array 606*a*).

Figure 6B:
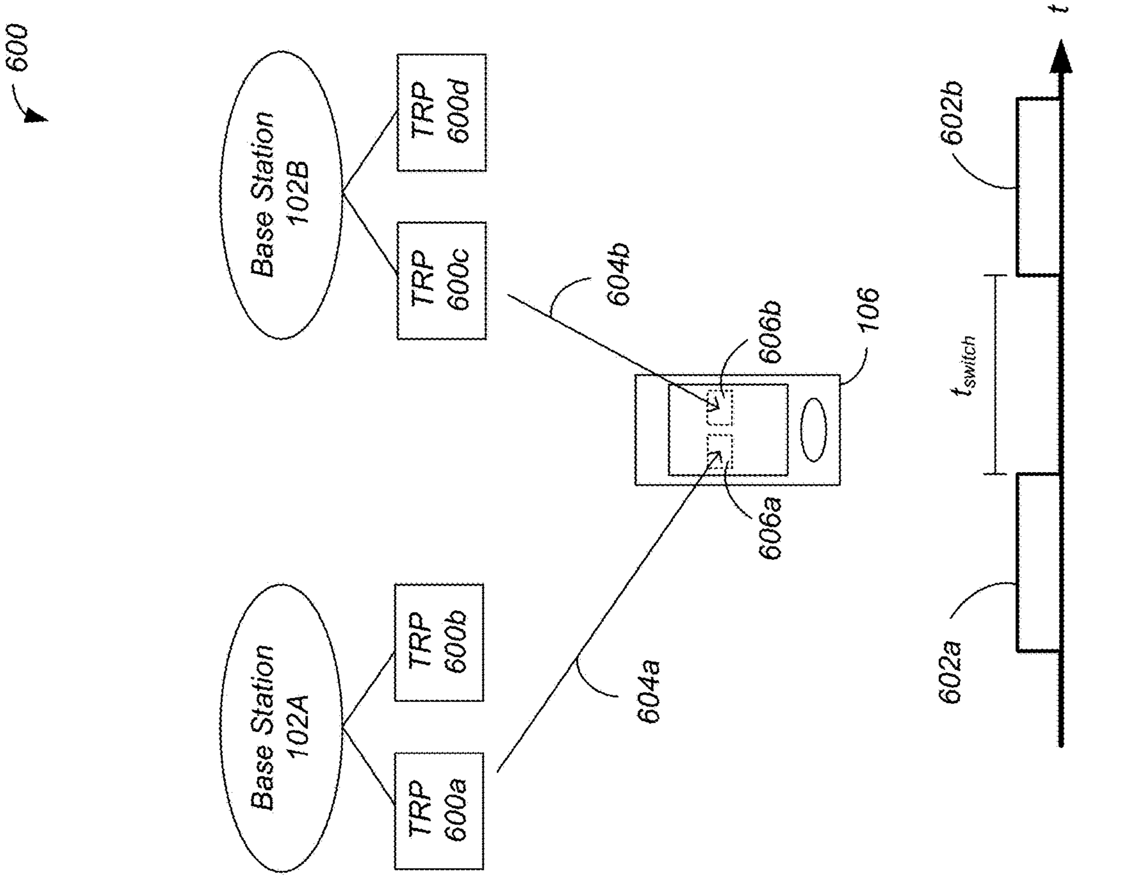

In some embodiments, the switch delay time $t_{switch}$ can be selected based on the amount of time that is needed for the UE device 106 to switch from measuring the properties of one beam using a first antenna array, to measuring the properties of another beam using a second antenna array. For example, referring to FIG. 6B, the base station 102A can transmit a first instance of data 602*a* to the UE device 106 using the TRP 600*a* (e.g., by forming a beam 604*a* directed towards the UE device 106 using the TRP 600*a*). The UE device can receive the first instance of data 602*a* by activating a first antenna array 606*a*, measuring the properties of the beam 604*a* using the first antenna array 606*a*, and decoding the first instance of data 602*a* from the measurements. Subsequently, the base station can 102B transmit a second instance of data 602*b* to the UE device 106 using the TRP 600*d* (e.g., by forming a beam 604*b* directed towards the UE device 106 using the TRP 600*d*). The UE device can receive the second instance of data 602*b* by activating a second antenna array 606*b*, measuring the properties of the beam 604*b* using the second antenna array 606*b*, and decoding the second instance of data 602*b* from the measurements. As shown in FIG. 6B, the switch delay time $t_{switch}$ between transmissions of the instances of data is longer compared to that shown in FIG. 6A, due to the time needed to switch between use of the first antenna array 606*a* and use of the second antenna array 606*b* (e.g., to account for additional time to activate the second antenna array 606*b* and switch to use of the second antenna array 606*b*).

Although FIGS. 6A and 6B show the switch delay time $t_{switch}$ varying depending one whether the UE device 106 receives transmissions using the same antenna array or different antenna arrays, this is merely an illustrative example. In practice, the switch delay time $t_{switch}$ can also vary based on other factors. As examples, the switch delay time $t_{switch}$ can vary depending on whether antenna array is in an active state or dormant state (e.g., in a sleep state or power saving state).

In some embodiments, a UE device 106 can report a switch delay time $t_{switch}$ to one or more other devices of a wireless network (e.g., one or more base stations 102), such that the other devices can transmit and/or receive data from the UE device 106 in a manner consistent with the capabilities of the UE device 106 (e.g., schedule transmitting and/or receiving data with at least the switch delay time $t_{switch}$ between instances of data). In some embodiment, a UE device 106 can report a single switch delay time $t_{switch}$ that is to be used when communicating with the UE device 106. In some embodiment, a UE device 106 can dynamically report different switch delay time $t_{switch}$ over a period of time, depending on the current or anticipated state of the UE device.

In some embodiments, a UE device 106 can dynamically determine an appropriate switch delay time $t_{switch}$ that is to be used when communicating with the UE device 106 (e.g., by determining the conditions in which data is to be transmitted or received, such as whether the data is to transmitted or received using the same antenna array or different antenna arrays). Upon determining an appropriate switch delay time $t_{switch}$, the UE device 106 can transmit an indication of the switch delay time $t_{switch}$ over the wireless network (e.g., an indication of the switch delay time $t_{switch}$ via a radio resource control/MAC control element/level 1, RRC/MAC-CE/L1, message to one or more base stations). In some embodiments, the UE device 106 can express the switch delay time $t_{switch}$ as an absolute length of time in units of time (e.g., milliseconds). In some embodiments, the UE device 106 can express the switch delay time $t_{switch}$ as a number of symbols (e.g., by specifying a particular value for the parameter "StartSymbolOffsetK"). In some embodiments, the UE device 106 can select a switch delay time $t_{switch}$ from among a pool of candidate switch delay times (e.g., 0, 1, 2, 3, 4, 5, 6, or 7 symbols). In some embodiments, the UE device 106 can select any switch delay time $t_{switch}$ (e.g., any number of symbols).

In some embodiments, the switch delay time $t_{switch}$ can be used to determine the length of time between transmissions according to an intra-slot transmission scheme (e.g., "Scheme 3"). For example, the switch delay time $t_{switch}$ can specify the amount of time that is between the end of the transmission of one instance of data, and the beginning of the transmission of another instance of data within the same slot. In some embodiments, the switch delay time $t_{switch}$ can be the minimum allowable time between the end of the transmission of one instance of data, and the beginning of the transmission of another instance of data within the same slot In some embodiments, the switch delay time $t_{switch}$ can be used to determine the length of time between transmissions according to an inter-slot transmission scheme (e.g., "Scheme 4"). For example, the switch delay time $t_{switch}$ can specify the amount of time that is between the end of the transmission of one instance of data within one slot, and the beginning of the transmission of another instance of data within another slot. In some embodiments, the switch delay time $t_{switch}$ can be the minimum allowable time between the end of the transmission of one instance of data within one slot, and the beginning of the transmission of another instance of data within another slot.

In some implementations, a UE device 106 can group different types of beams into different logical groups (e.g., "logical panel IDs"), and assign a different switch delay time $t_{switch}$ to each logical group. Each of the logical groups can be based on the properties of the beam and/or the antennas used to generate and/or receive those beams. As an example, beams can be grouped based on factors such as the transmission configuration indicator (TCI) associated with the beams, the spatial relationship between the beams, sounding reference signal (SRS) groups associated with the beams, the channel status information reference signal (CSI-RS) groups associated with the beams, the port groups associated with the beams, the reporting groups associated with the beams, or any other property associated with the beams and/or the antenna arrays. Further, the UE device 106 can assign a different switch delay time $t_{switch}$ to each logical group, based on those properties.

In some embodiments, the switch delay time $t_{switch}$ can also depend on whether a first beam and a subsequent second beam are associated with the same logical group (e.g., a beam switch within the same logical group, which may require a relatively shorter switch delay time), or whether a first beam and a subsequent second beam are associated with different logical groups (e.g., a beam switch across different logical groups, which may require a relatively longer switch delay time). In some embodiments, the UE device 106 can dynamically update the switch delay time, and indicate the updated switch delay time to the other devices of the network (e.g., by transmitting an indication of the switch delay time $t_{switch}$ via a RRC/MAC-CE/L1 message to one or more base stations).

In the examples described above (e.g., with respect to FIGS. 6A and 6B), a UE device 106 specifies a switch delay time $t_{switch}$ for transmitting downlink data from one or more base stations 102 to the UE device 106. However, in some embodiments, the UE device 106 can specify a switch delay time $t_{switch}$ for transmitting uplink data from the UE device 106 to one or more base stations 102, in a similar manner as described above. In some embodiments, the UE device 106 can specify different switch delay times $t_{switch}$ for transmitting uplink data and downlink data, respectively. In some embodiments, the UE device 106 can specify that the same switch delay time $t_{switch}$ be used for transmitting uplink data and downlink data.

Default User Equipment Behavior With Respect to Beam Switching

As described herein, a UE device 106 may require that there be a particular switch delay time $t_{switch}$ between the transmission or receipt of successive instances of data using different beams (e.g., due to the time needed to switch between different beams and/or different antenna arrays). Further, as described herein, a UE device 106 can report an appropriate switch delay time $t_{switch}$ to be used when communicating with the UE device 106.

Figure 7A:
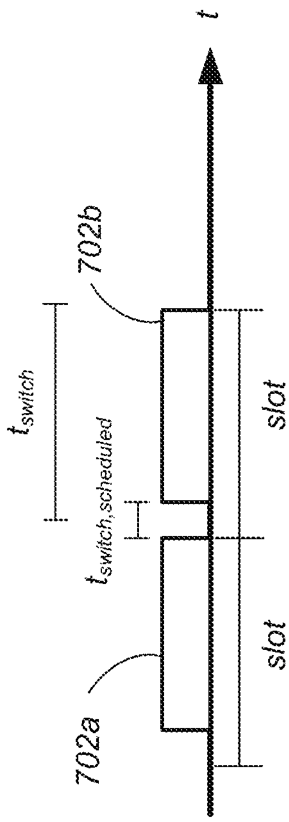
FIGS. 7A and 7B illustrate example schedules for transmitting or receiving data that may exceed the capabilities of a device.
Figure 7B:
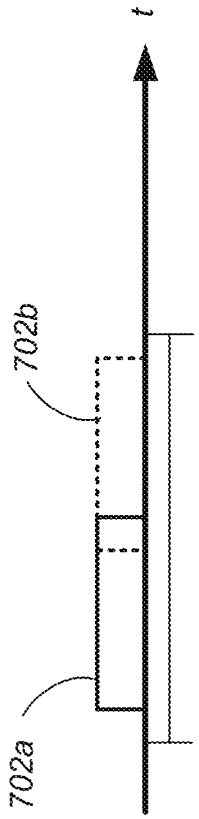

However, in some embodiments, the other devices of a wireless network might schedule data transmissions or receptions in manner that exceeds the capabilities of the UE device 106. For example, referring to FIG. 7A, a schedule may specify that the UE device 106 transmit or receive two instances of data 702*a* and 702*b* using two different beams, with a scheduled switch delay time $t_{switch,scheduled}$ that is less than the minimum switch delay time $t_{switch}$ that can be achieved by the UE device 106. As another example, referring to FIG. 7B, a schedule may specify that the UE device 106 transmit or receive two instances of data 702*a* and 702*b* using two different beams, during to overlapping periods of time.

In some embodiments, when the schedule exceeds the capabilities of the UE device 106, the UE device 106 can revert to transmitting or receiving data according to a pre-defined "default" scheme. This can be useful, for example, as it enables the devices on the network to handle data transmissions or receptions in a more predictable manner (e.g., thereby reducing inconsistencies in data handling).

In some embodiments, when the schedule exceeds the capabilities of the UE device 106, the UE device 106 can process the transmission or reception of the initial instance of data, and drop the transmission or reception of the subsequent instance of data (e.g., do not transmit or receive the subsequent instance of data). In some embodiments, the UE device 106 can transmit an indication that it has dropped the transmission or reception of the subsequent instance of data (e.g., by transmitting an appropriate message to one or more base stations).

In some embodiments, when the schedule exceeds the capabilities of the UE device 106, the UE device 106 can process the transmission or reception of the instances of data using the same beam, despite the schedule indicating that they are to be transmitted or received using different beams. In some embodiments, the UE device 106 can transmit or receive each of the instances of data using the beam that had been scheduled to transmit the first instance of data. In some embodiments, the UE device 106 can transmit an indication that it is transmitting or receiving data in this manner, rather than according to the scheduled scheme.

In some embodiments, when the schedule exceeds the capabilities of the UE device 106, the UE device 106 can process the transmission or reception of the instances of data using the beam associated with the control resource set (CORESET) that had been used to previously receive control information to the wireless network. A CORESET is, for example, an allotment of network resources in the time domain and the frequency domain (e.g., a resource block or slot spanning a range of continuous frequents and a range of continuous times).

In some embodiments, each CORESET that is available for use by the UE device 106 can be assigned a corresponding CORESET ID (e.g., a logical index, such as a numerical value). When the schedule exceeds the capabilities of the UE device 106, the UE device 106 can process the transmission or reception of one or more instances of data using the beam associated with the CORESET having the lowest CORESET ID. In some embodiments, the UE device 106 can transmit an indication that it is transmitting or receiving data in this manner, rather than according to the scheduled scheme.

In some embodiments, each CORESET that is available for use by the UE device 106 can be assigned a corresponding CORESET ID (e.g., a logical index, such as a numerical value). When the schedule exceeds the capabilities of the UE device 106, the UE device 106 can process the transmission or reception of one or more instances of data using the beam associated with the CORESET having the lowest CORESET ID in the latest monitored slot (e.g., the CORESET that was most recently used by the UE device to monitor for transmission from the wireless network). In some embodiments, the UE device 106 can transmit an indication that it is transmitting or receiving data in this manner, rather than according to the scheduled scheme.

In some embodiments, a UE device 106 may operate according to one of multiple different transmission configuration indicator (TCI) states when communicating with the network. Further, each TCI state can be assigned a corresponding TCI ID (e.g., a logical index, such as a numerical value). When the schedule exceeds the capabilities of the UE device 106, the UE device 106 can process the transmission or reception of one or more instances of data using the beam associated with the active TCI state having the lowest TCI ID. As an example, a TCI ID can be presented by three bits in a sequence. The beam associated with the active TCI state having a TCI ID of 000 can be selected to transmit one or more of the instances of data. In some embodiments, the UE device 106 can transmit an indication that it is transmitting or receiving data in this manner, rather than according to the scheduled scheme.

Early Termination of the Data Repetition During Intra-Slot Repetition or Inter-Slot Repetition As described herein, a device can transmit the same data to another device multiple times in different slots (e.g., one instance of the data is included in each of several frequency domain and/or time domain resource allocation slots). This may be referred to as inter-slot repetition or "Scheme 4" according to 5G NR standards. This can be beneficial, for example, in improving the fidelity of the transmission.

In some embodiments, the recipient device can selectively terminate the repetition of data that is transmitted to it. For example, referring to FIG. 8, a transmission can be scheduled whereby several instances of the same data 800*a*, 800*b*, . . . , 800*n* are to be transmitted from a base station 102 device a UE device 106 in several different slots (e.g., 16 instances of the same data in 16 different slots). Prior to receiving the final instance of the data 800*n*, the UE device 106 can determine that it has successfully decoded the data (e.g., based on the already received instances of the data), and transmit a message 802 to the transmitting device to terminate further transmission of the instance of data. Upon receiving the message 802, the base station 102 terminates the transmission of further instances of the data to the UE device 106. This can be beneficial, for example, in reducing the resource and/or time that is needed to transmit data across the network.

Figure 8:
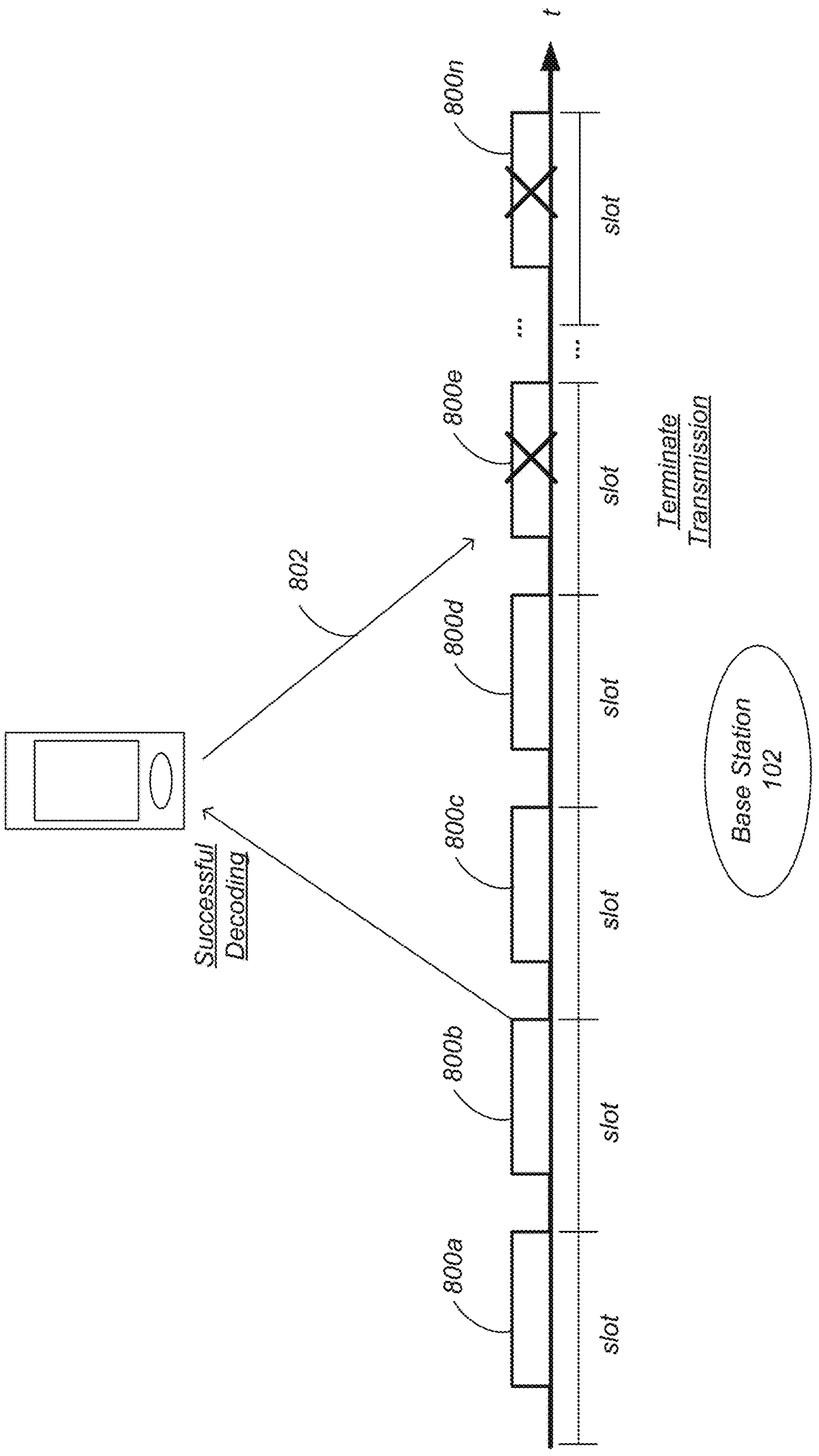
FIG. 8 illustrates an example process for the early terminating of data repetition during an inter-slot repetition transmission scheme.

Although FIG. 8 shows terminating a repeated data transmission from a base station to a UE device (e.g., downlink data), a repeated data transmission from a UE device to a base station (e.g., uplink data) also can be terminated in a similar manner (e.g., by sending an appropriate message 802 from a base station to a UE device).

In some embodiments, the message 802 can be transmitted to terminate the repetition of downlink transmissions (e.g., downlink transmissions from a base station to a UE device). As an example, a UE device can transmit the message 802 in the form of an acknowledgement (ACK) or negative acknowledgment (NAK) indication via a physical uplink control channel (PUCCH) established between the UE device and the base station.

In some embodiments, the message 802 can be transmitted to terminate the repetition of uplink transmissions (e.g., uplink transmissions from a UE device to a base station). As an example, a base station can transmit DCI information to the UE device (e.g., to schedule future data transmissions or receptions) that includes the message 802 (e.g., an ACK or NAK). In some embodiments, the message 802 can be included in a hybrid automatic repeat request (HARQ) having the same process ID as that used to schedule the previous transmission or reception of data, but with a flipped new data indicator (NDI) bit, such as from 0 to 1 or from 1 to 0, indicating that the previous data was successfully received. In some embodiments, the message 802 (e.g., an ACK or NAK) can be transmitted in a physical channel configured to indicate a successful reception of data over the wireless network (e.g., a physical channel established between the base station the UE device). In some embodiments, the message 802 (e.g., an ACK or NAK) can be transmitted in a physical hybrid indication channel (PHICH) established between the base station the UE device.

Handling Transmissions and Receptions when there is an Insufficient Number of Symbols within a Slot In some embodiments, a device can transmit the same data to another UE device multiple times in the same slot (e.g., the same frequency domain and/or time domain resource allocation slot). This may be referred to as intra-slot repetition or "Scheme 3" according to 5G NR standards. Each instance of data (e.g., PDSCH or PUSCH data) can have the same length or time duration in the slot. Further, sequential instances of data can be separated from one another by a particular offset length of time.

Figure 9:
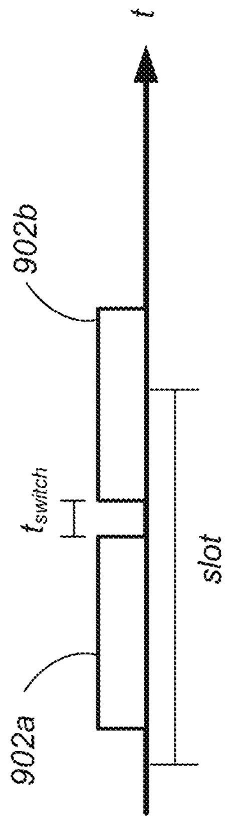
FIG. 9 illustrates an intra-slot repetition of data that may exceed the boundaries of an allocated slot.

However, in some embodiments, the length of the slot may be too short to accommodate the transmission of two instances of the data and an appropriate switch delay time $t_{switch}$. For instance, referring to FIG. 9, a slot may be allocated a particular number of symbols, but the sum of the length of the two instances of data 902*a* and 902*b* and the switch delay time $t_{switch}$ may exceed the number of symbols allocated to the slot.

In some embodiments, when the length of the slot is insufficient to transmit or receive two instances of data in that slot, the UE device can revert to transmitting or receiving data according to a pre-defined "default" scheme. This can be useful, for example, as it enables the devices on the network to handle data transmissions or receptions in a more predictable manner (e.g., thereby reducing inconsistencies in data handling).

In some embodiments, when the length of the slot is insufficient to transmit or receive two instances of data in that slot, the UE device 106 can process the transmission or reception of the initial instance of data, and drop the transmission or reception of the subsequent instance of data (e.g., do not transmit or receive the subsequent instance of data). In some embodiments, the UE device 106 can transmit an indication that it has dropped the transmission or reception of the subsequent instance of data (e.g., by transmitting an appropriate message to one or more base stations).

In some embodiments, when the length of the slot is insufficient to transmit or receive two instances of data in that slot, the UE device 106 can process the transmission or reception of across the slot boundary (e.g., transmit or receive the second instance of data at least partially during the next slot in time). In some embodiments, the UE device 106 can transmit an indication that it is transmitting or receiving data in this manner, rather than according to the scheduled scheme.

In some embodiments, when the length of the slot is insufficient to transmit or receive two instances of data in that slot, the UE device 106 can truncate any portion of the instances of data that would exceed the trailing slot boundary, such that both instances of the data can be transmitted or received within the boundaries of the slot. Further, the UE device can perform rate matching or puncturing to fit the transmission or receipt of the instances of data into the slot. In some embodiments, the UE device 106 can transmit an indication that it is transmitting or receiving data in this manner, rather than according to the scheduled scheme.

Dynamic Point Selection (DPS) with Repetition

In some embodiments, devices can be transmitted over a wireless network using dynamic point section (DPS) communication protocol. According to a DPS communication protocol, a transmitting device identifies multiple available TRPs to which it can send data to a receiving device. The transmitting device selects one of the TRPs based on one or more quality metrics (e.g., signal strength, path loss, latency, etc.) and transmits the data to the receiving device through the selected TRP. Further, the transmitting device can dynamically select different TRPs over time, depending on changes to the one or more quality metrics.

In some embodiments, a DPS communication protocol can be used in conjunction with intra-slot or inter-slot repetition. As an example, a UE device can obtain control information regarding how data is to be transmitted over the wireless network. The UE device can selectively use a DPS communication protocol with either intra-slot repetition or inter-slot repetition when the control information indicates that certain criteria have been met.

As an example, a UE device can obtain control information regarding a number of transmission configuration indication (TCI) states associated with the transmission, an indication of a number of code division multiplexing (CDM) groups associated with the transmission, an indication of a number of repetitions by which to transmit the data, and/or an indication of a transmission scheme associated with the transmission (e.g., either intra-slot or inter-slot repetition). If (i) the number of TCI state is 1, (ii) the number of CDM groups is 1 or more, (iii) an intra-slot repetition transmission scheme is indicated ("Scheme 3"), and (iv) the number of repetitions is not indicated or is 1, the UE device can select a DPS communication protocol with intra-slot repetition, and transmit the data to the network using the selected scheme.

As an example, a UE device can obtain control information regarding a number of transmission configuration indication (TCI) states associated with the transmission, an indication of a number of code division multiplexing (CDM) groups associated with the transmission, an indication of a number of repetitions by which to transmit the data, and/or an indication of a transmission scheme associated with the transmission (e.g., either intra-slot or inter-slot repetition). If (i) the number of TCI state is 1, (ii) the number of CDM groups is 1 or more, (iii) the transmission scheme associated with the transmission is not indicated or is indicated as an inter-slot repetition transmission scheme ("Scheme 4"), and (iv) the number of repetitions is greater than 1, the UE device can select a DPS communication protocol with inter-slot repetition, and transmit the data to the network using the selected scheme.

As an example, a UE device can obtain control information regarding a number of transmission configuration indication (TCI) states associated with the transmission, an indication of a number of code division multiplexing (CDM) groups associated with the transmission, an indication of a number of repetitions by which the transmit the data, and/or an indication of a transmission scheme associated with the transmission (e.g., either intra-slot or inter-slot repetition). If (i) the number of TCI state is 1, (ii) the number of CDM groups is 1 or more, (iii) an intra-slot repetition transmission scheme is indicated ("Scheme 3"), the UE device can select a DPS communication protocol with intra-slot repetition, and transmit the data to the network using the selected scheme.

As an example, a UE device can obtain control information regarding a number of transmission configuration indication (TCI) states associated with the transmission, an indication of a number of code division multiplexing (CDM) groups associated with the transmission, an indication of a number of repetitions by which to transmit the data, and/or an indication of a transmission scheme associated with the transmission (e.g., either intra-slot or inter-slot repetition). If (i) the number of TCI state is 1, (ii) the number of CDM groups is 1 or more, (iii) the transmission scheme associated with the transmission is not indicated or is not indicated as an intra-slot repetition transmission scheme (not "Scheme 3"), and (iv) the number of repetitions is greater than 1, the UE device can select a DPS communication protocol with inter-slot repetition, and transmit the data to the network using the selected scheme.

Example Processes

Figure 10A:
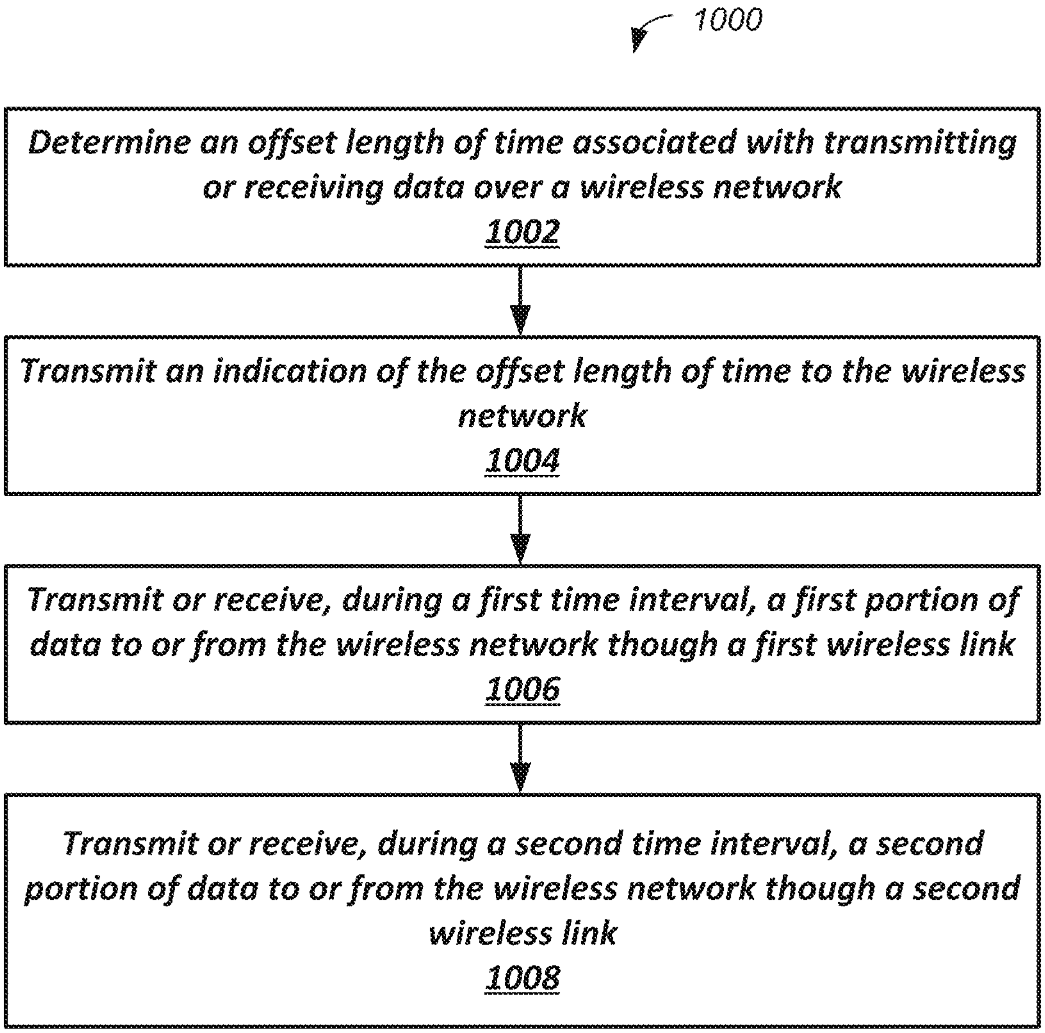
FIGS. 10A-10I illustrate example processes for transmitting and/or receiving data over a wireless network.

FIG. 10A shows an example process 1000 for transmitting and/or receiving data over a wireless network. The process 1000 can be performed by one or more of the devices described herein. As an example, the process 1000 can be performed by a UE device 160 to transmit data to and/or receive data from a base station 102.

According to the process 1000, a UE device determines an offset length of time associated with transmitting or receiving data over a wireless network (step 1002).

In some embodiments, the offset length of time can be expressed as a number of network transmission symbols. In some embodiments, the offset length of time can be expressed in a unit of time (e.g., milliseconds). In some embodiments, the offset length of time can be determined by selecting the offset length of time from a plurality of candidate offset lengths of time.

The UE device transmits an indication of the offset length of time to the wireless network (step 1004).

The UE device transmits or receives, during a first time interval, a first portion of data to or from the wireless network though a first wireless link (step 1006). As an example, the UE device can transmit the first portion of data to or receive the first portion of data from a base station of the wireless network.

The UE device transmits or receives, during a second time interval, a second portion of data to or from the wireless network though a second wireless link (step 1008). As an example, the UE device can transmit the second portion of data to or receive the second portion of data from a base station of the wireless network. An end of first time interval is offset from a beginning of the second time interval by the offset length of time.

In some embodiments, the first portion of data can identical to the second portion of data. For example, the first portion of data and the second portion of data can each include the same data (e.g., the same data packet) encoded according to the same encoding scheme. As another example, the first portion of data and the second portion of data can each include the same data, but encoded according to different encoding schemes. Accordingly, the same underlying data can be transmitted and/or received (e.g., "identical" instances of data are transmitted or received). However, the actual signals that are transmitted between the devices may differ, due to the use of different encoding schemes.

In some embodiments, the first portion of data can correspond to a first physical downlink shared channel (PDSCH), and the second portion of data can correspond to a second PDSCH.

In some embodiments, the first wireless link can correspond to a first beam generated by first antenna array of the UE device, and the second wireless link can correspond to a second beam generated by the first antenna array.

In some embodiments, the first wireless link can correspond to a first beam generated by first antenna array of the UE device, and the second wireless link can correspond to a second beam generated by a second antenna array of the UE device.

In some embodiments, the first portion of data and the second portion of data can be transmitted within a same slot with respect to a time domain (e.g., according to an intra-slot repetition transmission scheme). In some embodiments, the first portion of data and the second portion of data can be transmitted during different respective slots with respect to a time domain (e.g., according to an inter-slot repetition transmission scheme).

In some embodiments, the offset length of time can be determined based on one or more characteristics of the first wireless link and the second wireless link. For example, the offset length of time can be determined based on a determination that the first wireless link and the second wireless link are associated with a common logical grouping with respect to one or more antenna arrays of the UE device. As another example, the offset length of time can be determined based on a determination that the first wireless link and the second wireless link are associated with different respective logical groupings with respect to one or more antenna arrays of the UE device.

In some embodiments, subsequent to transmitting or receiving the second portion of data, the UE device can modify the offset length of time, and transmit an indication of the modified offset length of time to the wireless network (e.g., to one or more base stations of the wireless network). Further, the UE device can transmit or receive, during a third time interval, a third portion of data to or from the wireless network though a third wireless link. Further, the UE device can transmit or receive, during a fourth time interval, a fourth portion of data to or from the wireless network though a fourth wireless link. Ab end of third time interval can be offset from a beginning of the fourth time interval by at least the modified offset length of time.

In some embodiments, the UE device can determine a second offset length of time associated with receiving data over the wireless network, and transmit an indication of the second offset length of time to the wireless network. Further, the UE device can receive, during a third time interval, a third portion of data to the wireless network though a third wireless link. Further, the UE device can receive, during a fourth time interval, a fourth portion of data to the wireless network though a fourth wireless link. An end of third time interval can be offset from a beginning of the fourth time interval by at least the second offset length of time.

Figure 10B:
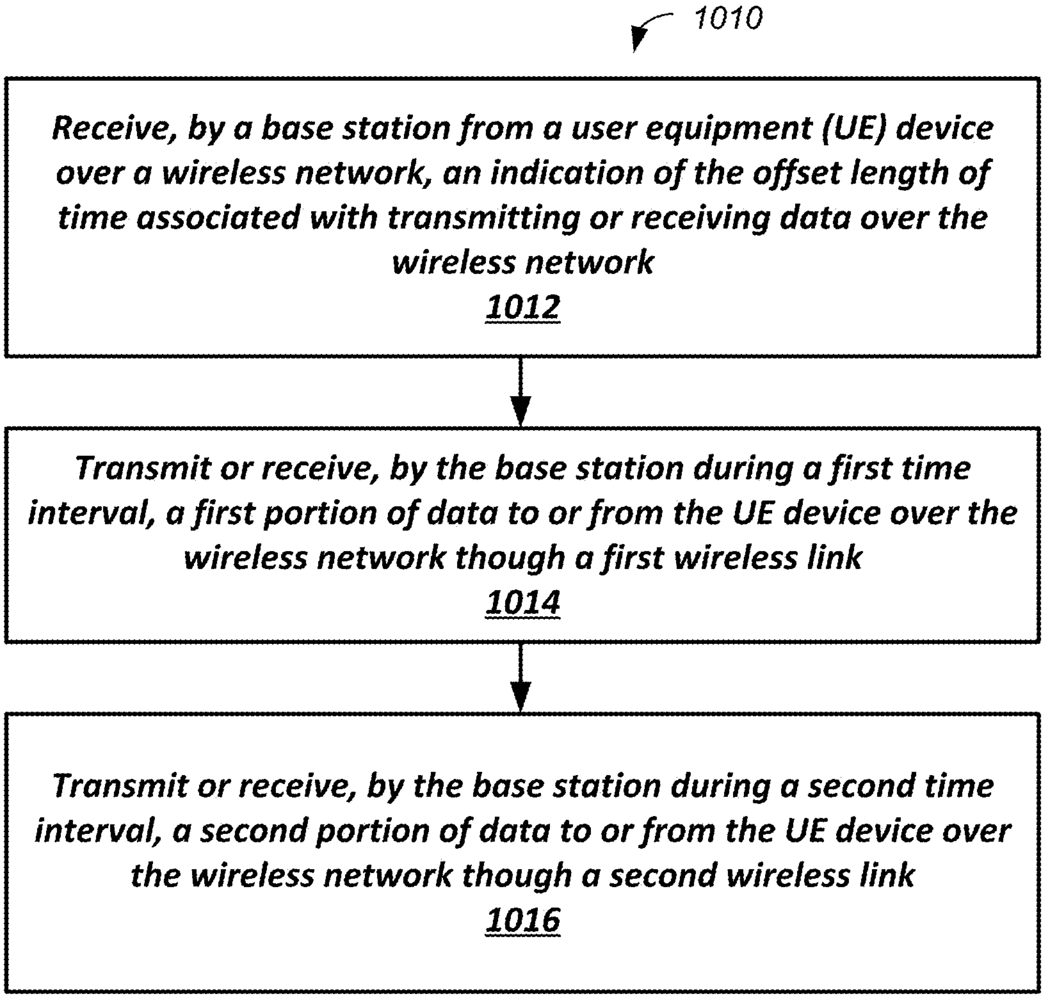

FIG. 10B shows another example process 1010 for transmitting and/or receiving data over a wireless network. The process 1010 can be performed by one or more of the devices described herein. As an example, the process 1010 can be performed by a base station 102 to transmit data to and/or receive data from a UE device 106.

According to the process 1010, a base station receives, from a UE device over a wireless network, an indication of the offset length of time associated with transmitting or receiving data over the wireless network (step 1012). In some embodiments, the offset length of time can be expressed as a number of network transmission symbols. In some embodiments, the offset length of time is expressed in a unit of time (e.g., milliseconds).

The base station transmits or receives, during a first time interval, a first portion of data to or from the UE device over the wireless network though a first wireless link (step 1014).

The base station transmits or receives, during a second time interval, a second portion of data to or from the UE device over the wireless network though a second wireless link (step 1016). An end of first time interval is offset from a beginning of the second time interval by the offset length of time.

In some embodiments, the first portion of data can be identical to the second portion of data. For example, the first portion of data and the second portion of data can each include the same data (e.g., the same data packet) encoded according to the same encoding scheme. As another example, the first portion of data and the second portion of data can each include the same data, but encoded according to different encoding schemes. Accordingly, the same underlying data can be transmitted and/or received (e.g., "identical" instances of data are transmitted or received). However, the actual signals that are transmitted between the devices may differ, due to the use of different encoding schemes.

In some embodiments, the first portion of data can correspond to a first physical downlink shared channel (PDSCH), and the second portion of data can correspond to a second PDSCH.

In some embodiments, the first wireless link can correspond to a first beam generated by first antenna array of the UE device, and the second wireless link can correspond to a second beam generated by the first antenna array.

In some embodiments, the first wireless link can correspond to a first beam generated by first antenna array of the UE device, and the second wireless link can correspond to a second beam generated by a second antenna array of the UE device.

In some embodiments, the first portion of data and the second portion of data can be transmitted within a same slot with respect to a time domain (e.g., according to an intra-slot repetition transmission scheme). In some embodiments, the first portion of data and the second portion of data can be transmitted during different respective slots with respect to a time domain (e.g., according to an inter-slot repetition transmission scheme).

In some embodiments, the UE device can determine the offset length of time by selecting the offset length of time from a plurality of candidate offset lengths of time.

In some embodiments, the UE device can determine the offset length of time based on one or more characteristics of the first wireless link and the second wireless link.

In some embodiments, the UE device can determine the offset length of time based on a determination that the first wireless link and the second wireless link are associated with a common logical grouping with respect to one or more antenna arrays of the UE device.

In some embodiments, the UE device can determine the offset length of time based on a determination that the first wireless link and the second wireless link are associated with different respective logical groupings with respect to one or more antenna arrays of the UE device.

In some embodiments, the process 1010 can further include, subsequent to transmitting or receiving the second portion of data, receiving, by the base station from the UE device, an indication of a modified offset length of time; transmitting or receiving, by the base station during a third time interval, a third portion of data to or from the UE device over the wireless network though a third wireless link; and transmitting or receiving, by the base station during a fourth time interval, a fourth portion of data to or from the UE device over the wireless network though a fourth wireless link. An end of third time interval can be offset from a beginning of the fourth time interval by at least the modified offset length of time.

In some embodiments, the process 1010 can further include receiving, by the station from the UE device, an indication of a second offset length of time associated with receiving data over the wireless network; receiving, by the base station during a third time interval, a third portion of data from the UE device over the wireless network though a third wireless link; and receiving, by the base station during a fourth time interval, a fourth portion of data from the UE device from the wireless network though a fourth wireless link. An end of third time interval can be offset from a beginning of the fourth time interval by at least the second offset length of time.

Figure 10C:
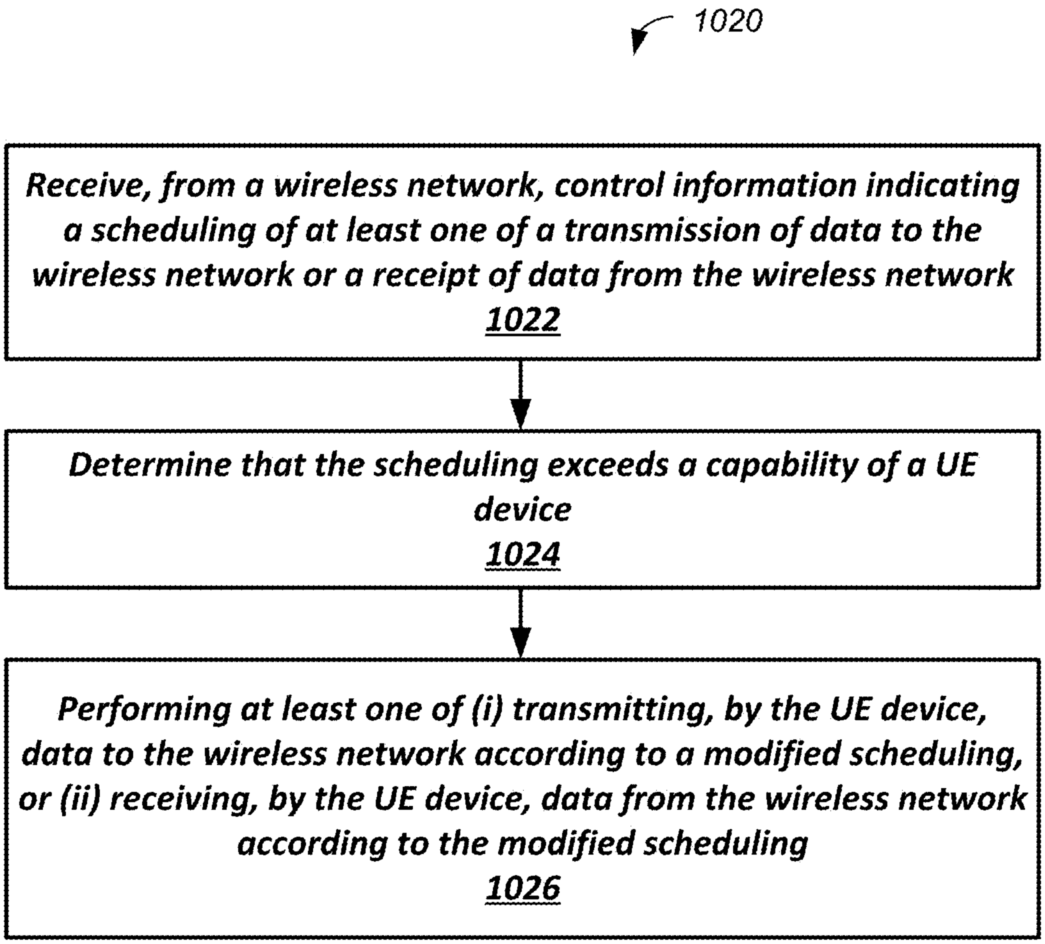

FIG. 10C shows another example process 1020 for transmitting and/or receiving data over a wireless network. The process 1020 can be performed by one or more of the devices described herein. As an example, the process 1020 can be performed by a UE device 160 to transmit data to and/or receive data from a base station 102.

According to the process 1020, a UE device receives control information indicating a scheduling of at least one of a transmission of data to the wireless network or a receipt of data from the wireless network (step 1022). The transmission or the receipt of data includes a transmission or receipt of a first portion of data according to a first beam, and a transmission or receipt of a second portion of data according to a second beam.

The UE device determines that the scheduling exceeds a capability of the UE device (step 1024).

Responsive to determining that the scheduling exceeds a capability of the UE device, the UE device performs at least one of (i) transmitting data to the wireless network according to a modified scheduling, or (ii) receiving data from the wireless network according to the modified scheduling (step 1026).

In some embodiments, transmitting data to the wireless network according to the modified scheduling can include transmitting the first portion of the data to the wireless network in accordance with the scheduling indicated by the control data, and not transmitting the second portion of data to the wireless network.

In some embodiments, receiving data from the wireless network according to the modified scheduling can include receiving the first portion of the data from the wireless network in accordance with the scheduling indicated by the control data, and not receiving the second portion of data from the wireless network.

In some embodiments, transmitting data to the wireless network according to the modified scheduling can include transmitting the first portion of data and the second portion of data according to a common beam. The common beam can be selected based on at least one of: (i) a control resource set (CORESET) having a lowest logical index from among a plurality of CORESETs configured for use with respect to the wireless network, (ii) a CORESET most recently used by the UE device to monitor for transmission from the wireless network, or (iii) an active transmission configuration indicator (TCI) state having a lowest logical index from among a plurality of TCI states of the UE device.

In some embodiments, receiving data from the wireless network according to the modified scheduling can include receiving the first portion of data and the second portion of data according to a common beam. The common beam can be selected based on at least one of: (i) a control resource set (CORESET) having a lowest logical index from another a plurality of CORESETs configured for use by the wireless network, (ii) a CORESET most recently used by the UE device to monitor for transmission from the wireless network, or (iii) an active transmission configuration indicator (TCI) state having a lowest logical index from among a plurality of TCI states of the UE device.

In some embodiments, the control information can include an indication that the first portion of data is to be transmitted during a first time interval and the second portion of data is to be transmitted during a second time interval, where an end of first time interval is offset from a beginning of the second time interval by the offset length of time. Further, determining that the scheduling exceeds the capability of the UE device can include determining that the offset length of time is less than a minimum offset length of time associated with the UE device.

In some embodiments, the control information can include an indication that the first portion of data is to be received during a first time interval and the second portion of data is to be received during a second time interval, where an end of first time interval is offset from a beginning of the second time interval by the offset length of time. Further, determining that the scheduling exceeds the capability of the UE device can include determining that the offset length of time is less than a minimum offset length of time associated with the UE device.

In some embodiments, the first portion of data can correspond to a first physical downlink shared channel (PDSCH), and the second portion of data can correspond to a second PDSCH.

Figure 10D:
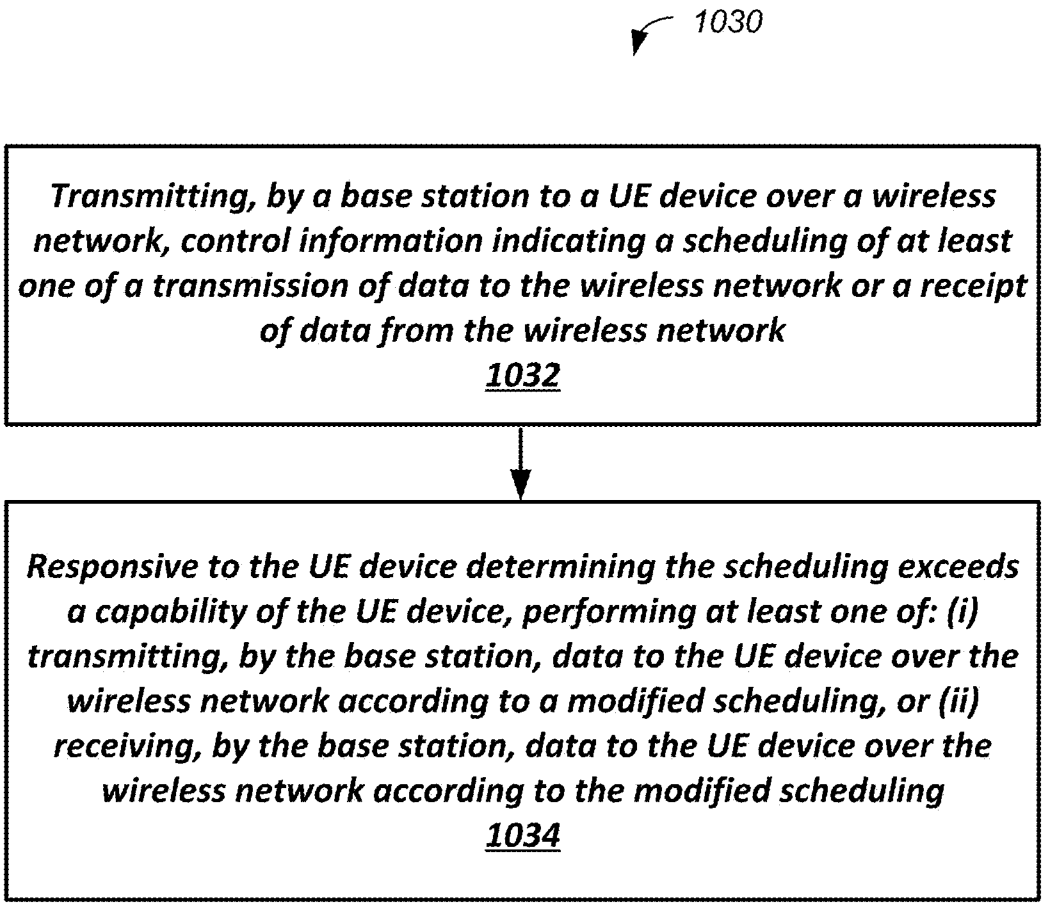

FIG. 10D shows another example process 1030 for transmitting and/or receiving data over a wireless network. The process 1030 can be performed by one or more of the devices described herein. As an example, the process 1030 can be performed by a base station 102 to transmit data to and/or receive data from a UE device 160.

According to the process 1030, by a base station transmits, to a user equipment (UE) device over a wireless network, control information indicating a scheduling of at least one of a transmission of data to the wireless network or a receipt of data from the wireless network (step 1032). The transmission or the receipt of data includes a transmission or receipt of a first portion of data according to a first beam, and a transmission or receipt of a second portion of data according to a second beam.

Responsive to the UE device determining the scheduling exceeds a capability of the UE device, the base station performs at least one of (i) transmitting data to the UE device over the wireless network according to a modified scheduling, or (ii) receive data to the UE device over the wireless network according to the modified scheduling (step 1034).

In some embodiments, the control information can include an indication that the first portion of data is to be transmitted during a first time interval and the second portion of data is to be transmitted during a second time interval. An end of first time interval can be offset from a beginning of the second time interval by the offset length of time. Further, the UE device can determine that the scheduling exceeds the capability of the UE device by determining that the offset length of time is less than a minimum offset length of time associated with the UE device.

In some embodiments, the control information can include an indication that the first portion of data is to be received during a first time interval and the second portion of data is to be received during a second time interval. An end of first time interval can be offset from a beginning of the second time interval by the offset length of time. The UE device can determine that the scheduling exceeds the capability of the UE device by determining that the offset length of time is less than a minimum offset length of time associated with the UE device.

In some embodiments, the first portion of data can correspond to a first physical downlink shared channel (PDSCH), and the second portion of data can correspond to a second PDSCH.

Figure 10E:
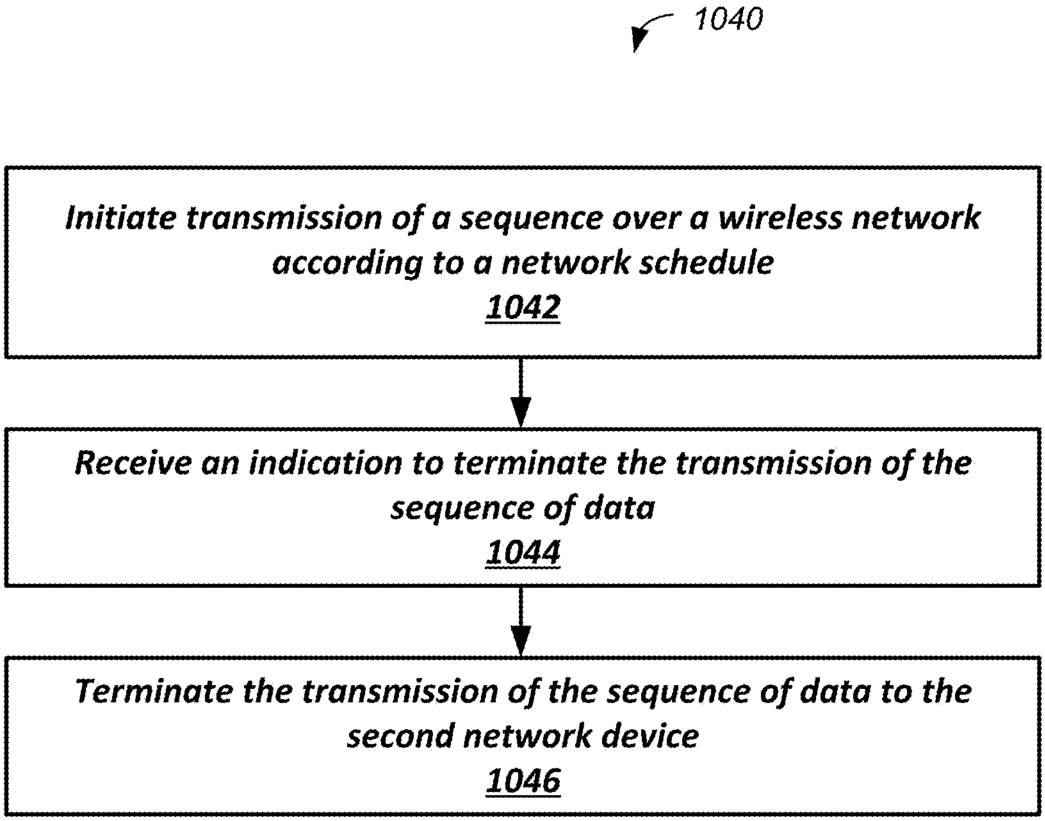

FIG. 10E shows another example process 1040 for transmitting and/or receiving data over a wireless network. The process 1040 can be performed by one or more of the devices described herein. As an example, the process 1040 can be performed by a base station 102 to transmit data to and/or receive data from a UE device 160.

According to the processor 1040, a first network device initiates transmission of a sequence of data to a second network device over a wireless network according to a network schedule (step 1042).

The first network device receives, from the second network device, an indication to terminate the transmission of the sequence of data (step 1044). In some embodiments, the indication can be received via a physical uplink control channel (PUCCH). In some embodiments, the indication can be received via a physical channel configured to indicate a successful reception of data over the wireless network. In some embodiments, the indication can be received via downlink control information (DCI) transmitted by the second network device.

Responsive to receiving the indication, the first network device terminates the transmission of the sequence of data to the second network device (step 1046). In some embodiments, terminating the transmission of the sequence of data can include terminating the periodic transmission of the portion of data.

Figure 10F:
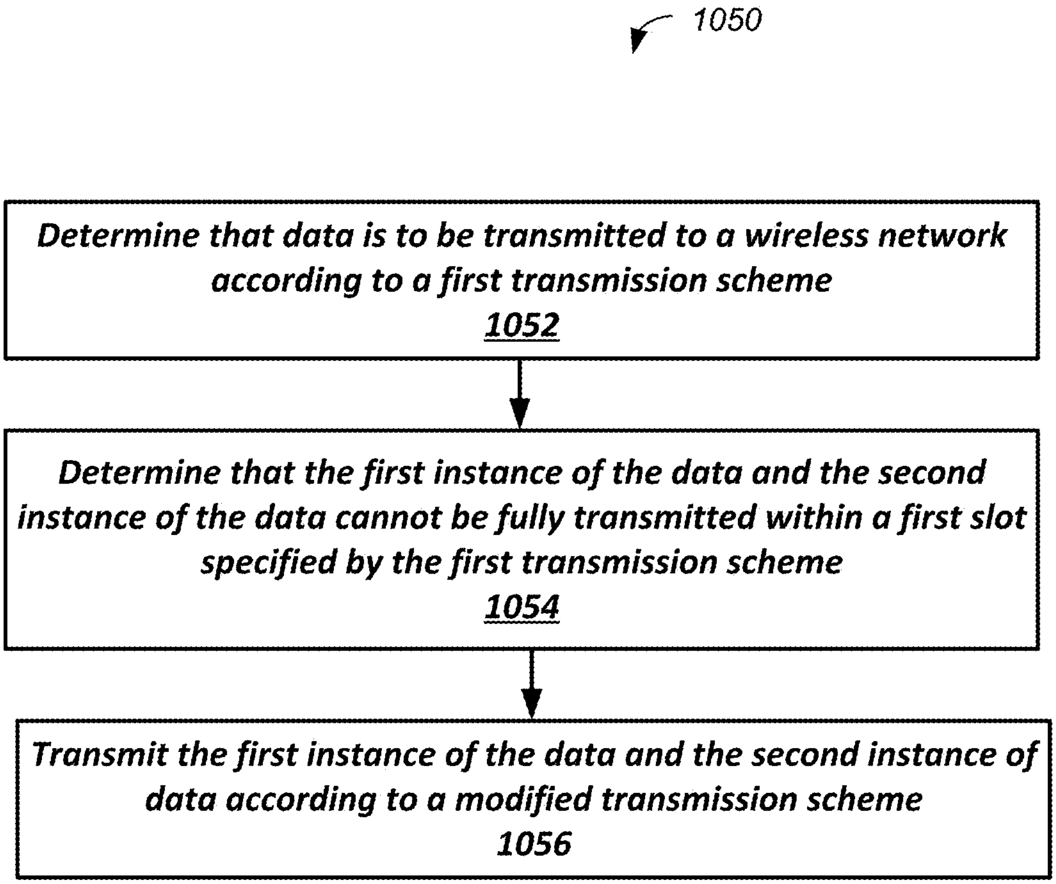

FIG. 10F shows another example process 1050 for transmitting and/or receiving data over a wireless network. The process 1050 can be performed by one or more of the devices described herein. As an example, the process 1050 can be performed by a UE device 160 to transmit data to and/or receive data from a base station 102.

According to the process 1050, a UE device determines that data is to be transmitted to a wireless network according to a first transmission scheme (step 1052). According to the first transmission scheme, a first instance of the data and a second instance of the data are to be transmitted within a first slot with respect to a time domain, and the first instance of the data is identical to the second instance of the data (e.g., intra-slot repetition transmission scheme).

For example, the first instance of data and the second instance of data can each include the same data (e.g., the same data packet) encoded according to the same encoding scheme. As another example, the first instance of data and the second instance of data can each include the same data, but encoded according to different encoding schemes. Accordingly, the same underlying data can be transmitted and/or received (e.g., "identical" instances of data are transmitted or received). However, the actual signals that are transmitted between the devices may differ, due to the use of different encoding schemes.

The UE device determines that the first instance of the data and the second instance of the data cannot be fully transmitted within the first slot (step 1054). In some embodiments, this determination can be made by determining that the transmission of the first instance of the data and the second instance of the data would exceed a length of time of the first slot.

Responsive to determining that the first instance of the data and the second instance of the data cannot be fully transmitted within the first slot, the UE device transmits first instance of the data and the second instance of data according to a modified transmission scheme (step 1056).

In some embodiments, transmitting the first instance of the data and the second instance of data according to the modified transmission scheme can include transmitting only the first instance of the data during the first slot.

In some embodiments, transmitting the first instance of the data and the second instance of data according to the modified transmission scheme can include transmitting the first instance of the data during the first slot, and transmitting the second instance of the data during the first slot and a second slot with respect to the time domain immediately subsequent to the first slot.

In some embodiments, transmitting the first instance of the data and the second instance of data according to the modified transmission scheme can include transmitting the first instance of the data during the first slot, truncating the second instance of the data, and transmitting the truncated second instance of the data during the first slot.

Figure 10G:
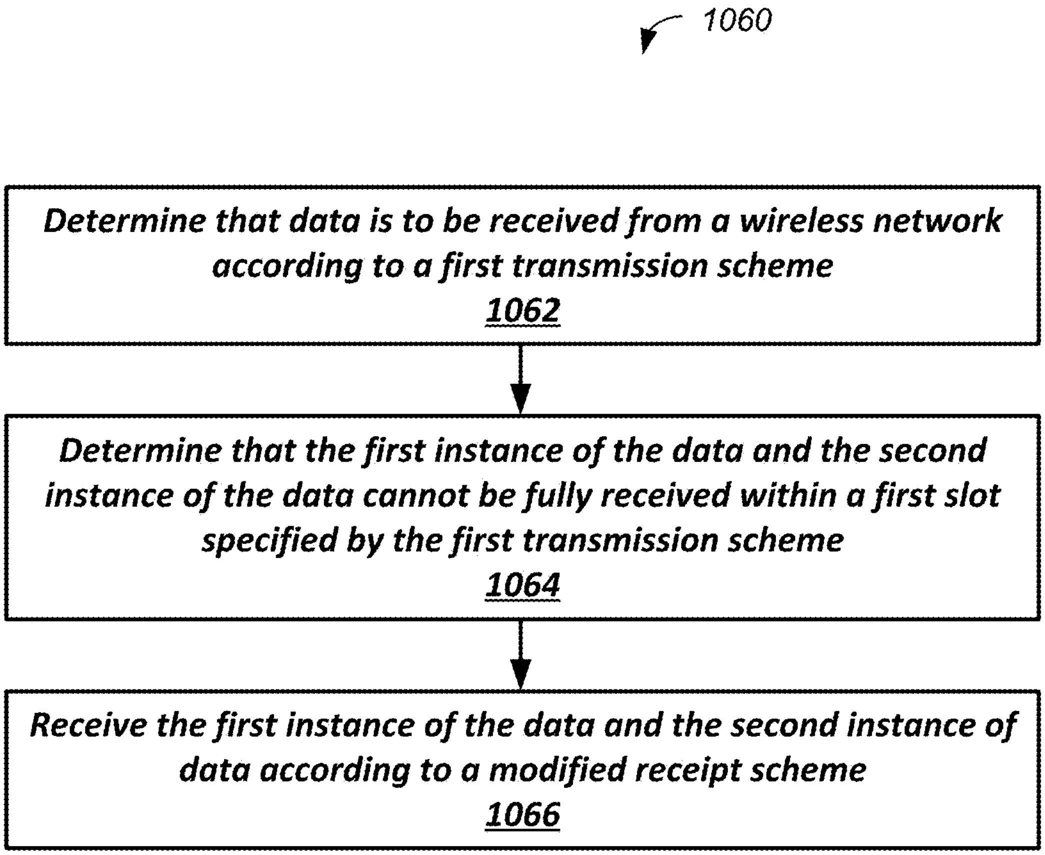

FIG. 10G shows another example process 1060 for transmitting and/or receiving data over a wireless network. The process 1060 can be performed by one or more of the devices described herein. As an example, the process 1060 can be performed by a UE device 160 to transmit data to and/or receive data from a base station 102.

According to the process 1060, a UE device determines data is to be received from a wireless network according to a first transmission scheme (step 1062). According to the first transmission scheme, a first instance of the data and a second instance of the data are to be received within a first slot with respect to a time domain, and the first instance of the data is identical to the second instance of the data (e.g., an intra-slot repetition transmission scheme).

For example, the first instance of data and the second instance of data can each include the same data (e.g., the same data packet) encoded according to the same encoding scheme. As another example, the first instance of data and the second instance of data can each include the same data, but encoded according to different encoding schemes. Accordingly, the same underlying data can be transmitted and/or received (e.g., "identical" instances of data are transmitted or received). However, the actual signals that are transmitted between the devices may differ, due to the use of different encoding schemes.

The UE device determines that the first instance of the data and the second instance of the data cannot be fully received within the first slot (step 1064). In some embodiments, this determination can be made by determining that the receipt of the first instance of the data and the second instance of the data would exceed a length of time of the first slot.

Responsive to determining that the first instance of the data and the second instance of the data cannot be fully received within the first slot, the UE device receives the first instance of the data and the second instance of data according to a modified receipt scheme (step 1066).

In some embodiments, receiving the first instance of the data and the second instance of data according to the modified transmission scheme can include receiving only the first instance of the data during the first slot.

In some embodiments, receiving the first instance of the data and the second instance of data according to the modified transmission scheme can include receiving the first instance of the data during the first slot, and receiving the second instance of the data during the first slot and a second slot with respect to the time domain immediately subsequent to the first slot.

Figure 10H:
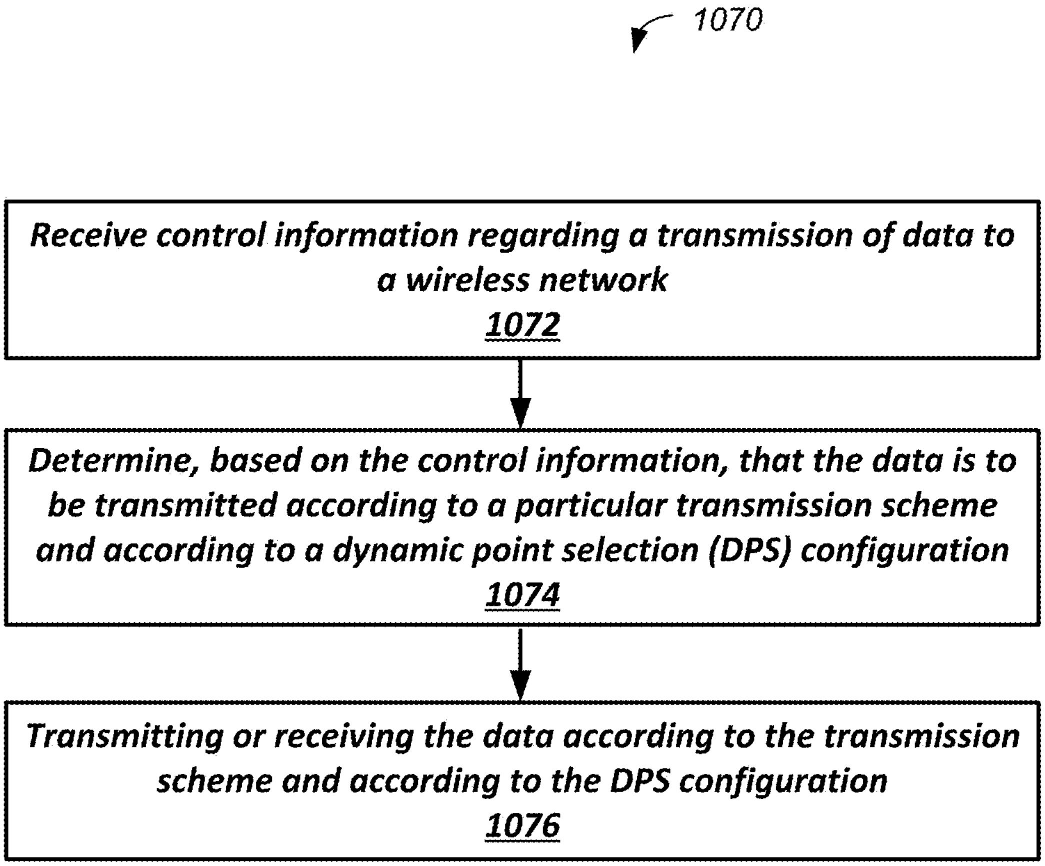

FIG. 10H shows another example process 1070 for transmitting and/or receiving data over a wireless network. The process 1070 can be performed by one or more of the devices described herein. As an example, the process 1070 can be performed by a UE device 160 to transmit data to and/or receive data from a base station 102.

According to the method 1070, a UE device receives control information regarding a transmission of data to a wireless network (step 1072). The control information includes at least (i) an indication of a number of transmission configuration indication (TCI) states associated with the transmission, (ii) an indication of a number of code division multiplexing (CDM) groups associated with the transmission, and (iii) an indication of a transmission scheme associated with the transmission. Transmission scheme is one of: (i) a first transmission scheme in which the data is transmitted multiple times within a same slot with respect to a time domain (e.g., an intra-slot repetition transmission scheme) or (ii) a second transmission scheme in which the data is transmitted multiple times during different respective slots with respect to the time domain (e.g., an inter-slot repetition transmission scheme).

The UE device determines, based on the control information, that the data is to be transmitted according to the transmission scheme and according to a dynamic point selection (DPS) configuration (step 1074).

The UE device transmits or receives the data according to the transmission scheme and according to the DPS configuration (step 1076). In some embodiments, transmitting or receiving the data according to the transmission scheme and according to the DPS configuration ca include selecting, a base station from among a plurality of base stations of the wireless network based on one or more quality metrics, generating, a beam directed to the selected base station using one or more antenna arrays, and transmitting or receiving the data to or from the selected base station using the beam and according to the transmission scheme.

In some embodiments, the control information can indicate that the first transmission scheme, one TCI state, and one or more CDM groups are associated with the transmission. Further, the UE device can determine, based on the control information, that the data is to be transmitted or received according to the first transmission scheme and according to the DPS configuration.

In some embodiments, the control information can further include an indication of a number of repetitions by which to transmit the data, the number of repetitions being equal to one. Further, the UE device can determine, based on the control information, that the data is to be transmitted or received according to the first transmission scheme and according to the DPS configuration.

In some embodiments, the control information can indicate that the second transmission scheme, one TCI state, and one or more CDM groups are associated with the transmission. Further, the UE device can determine, based on the control information, that the data is to be transmitted or received according to the second transmission scheme and according to the DPS configuration.

In some embodiments, the control information can further include an indication of a number of repetitions by which to transmit the data, where the number of repetitions being greater than one. Further, the UE device can determine, based on the control information, that the data is to be transmitted or received according to the second transmission scheme and according to the DPS configuration.

Figure 10I:
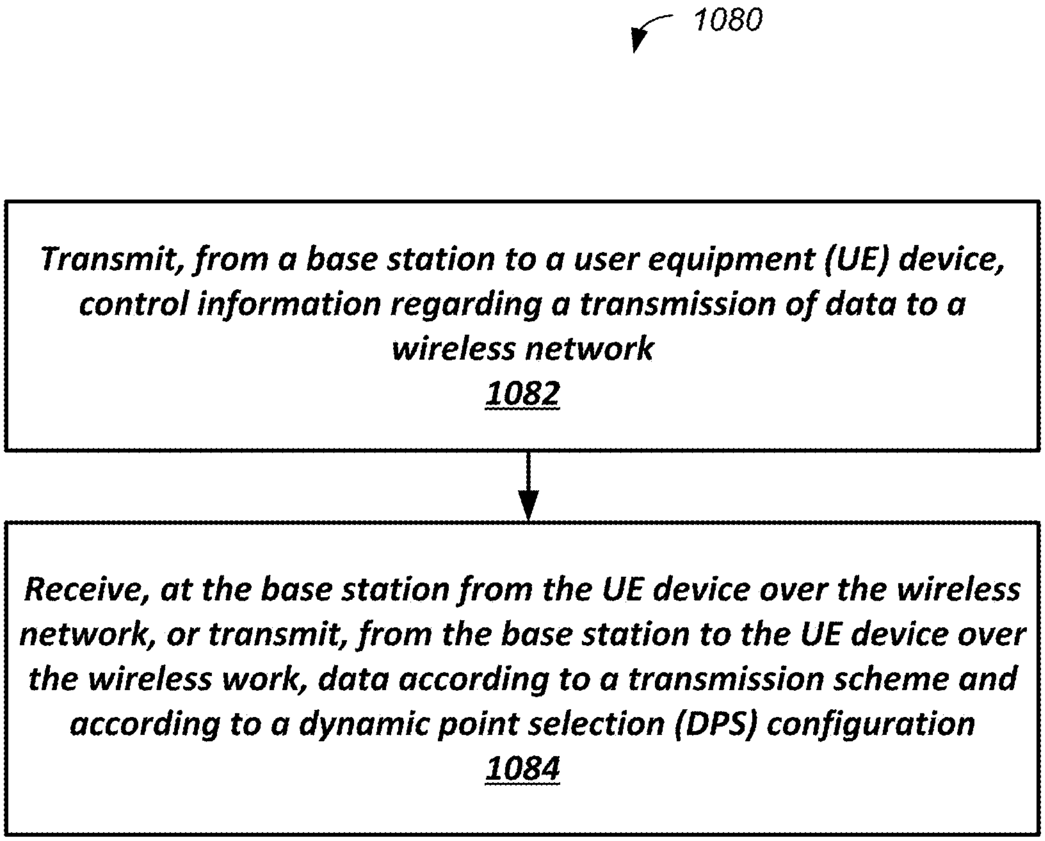

FIG. 10I shows another example process 1080 for transmitting and/or receiving data over a wireless network. The process 1080 can be performed by one or more of the devices described herein. As an example, the process 1080 can be performed by a base station 102 to transmit data to and/or receive data from a UE device 160.

According to the method 1060, a base station transmits, to a UE device, control information regarding a transmission of data to a wireless network (step 1082). The control information includes at least (i) an indication of a number of transmission configuration indication (TCI) states associated with the transmission, (ii) an indication of a number of code division multiplexing (CDM) groups associated with the transmission, and (iii) an indication of a transmission scheme associated with the transmission. The transmission scheme is one of: (i) a first transmission scheme in which the data is transmitted multiple times within a same slot with respect to a time domain (e.g., an intra-slot repetition transmission scheme), or (ii) a second transmission scheme in which the data is transmitted multiple times during different respective slots with respect to the time domain (e.g., an inter-slot repetition transmission scheme).

The base station receives, from the UE device over the wireless network, or transmits, to the UE device over the wireless work, data according to a transmission scheme and according to a dynamic point selection (DPS) configuration (step 1084). In some embodiments, transmitting or receiving the data according to the transmission scheme and according to the DPS configuration can include selecting, by the UE device, a base station from among a plurality of base stations of the wireless network based on one or more quality metrics, generating, by the UE device using one or more antenna arrays, a beam directed to the selected base station, and transmitting or receiving, by the UE device, the data to or from the selected base station using the beam and according to the transmission scheme.

In some embodiments, the control information can indicate that the first transmission scheme, one TCI state, and one or more CDM groups are associated with the transmission. Further, the UE device can determine, based on the control information, that the data is to be transmitted or received according to the first transmission scheme and according to the DPS configuration.

In some embodiments, the control information can further include an indication of a number of repetitions by which to transmit the data, the number of repetitions being equal to one. Further, the UE device can determine, based on the control information, that the data is to be transmitted or received according to the first transmission scheme and according to the DPS configuration.

In some embodiments, the control information can indicate that the second transmission scheme, one TCI state, and one or more CDM groups are associated with the transmission. Further, the UE device can determine, based on the control information, that the data is to be transmitted or received according to the second transmission scheme and according to the DPS configuration.

In some embodiments, the control information can further include an indication of a number of repetitions by which to transmit the data, the number of repetitions being greater than one. Further, the UE device can determine, based on the control information, that the data is to be transmitted or received according to the second transmission scheme and according to the DPS configuration.

User Privacy

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Non-limiting examples of the subject matter described herein are included in Appendices to the Specification.

Example implementations of the features described herein are provided below.

Example 1: a method includes: determining, by a user equipment (UE) device, an offset length of time associated with transmitting or receiving data over a wireless network; transmitting, by the UE device, an indication of the offset length of time to the wireless network; transmitting or receiving, by the UE device during a first time interval, a first portion of data to or from the wireless network though a first wireless link; and transmitting or receiving, by the UE device during a second time interval, a second portion of data to or from the wireless network though a second wireless link, where an end of first time interval is offset from a beginning of the second time interval by the offset length of time.

Example 2: a method includes the method of Example 1. Further, the first portion of data is identical to the second portion of data.

Example 3: a method includes the method of Example 1. Further, the first portion of data corresponds to a first physical downlink shared channel (PDSCH), and the second portion of data corresponds to a second PDSCH.

Example 4: a method includes the method of Example 1. Further, the first wireless link corresponds to a first beam generated by first antenna array of the UE device, and the second wireless link corresponds to a second beam generated by the first antenna array.

Example 5: a method includes the method of Example 1. Further, the first wireless link corresponds to a first beam generated by first antenna array of the UE device, and the second wireless link corresponds to a second beam generated by a second antenna array of the UE device.

Example 6: a method includes the method of Example 1. Further, the first portion of data and the second portion of data are transmitted within a same slot with respect to a time domain.

Example 7: a method includes the method of Example 1. Further, the first portion of data and the second portion of data are transmitted during different respective slots with respect to a time domain.

Example 8: a method includes the method of Example 1. Further, the offset length of time is expressed as a number of network transmission symbols.

Example 9: a method includes the method of Example 1. Further, the offset length of time is expressed in a unit of time.

Example 10: a method includes the method of Example 1. Further, the determining the offset length of time includes selecting the offset length of time from a plurality of candidate offset lengths of time.

Example 11: a method includes the method of Example 1. Further, the offset length of time is determined based on one or more characteristics of the first wireless link and the second wireless link.

Example 12: a method includes the method of Example 11. Further, the offset length of time is determined based on a determination that the first wireless link and the second wireless link are associated with a common logical grouping with respect to one or more antenna arrays of the UE device.

Example 13: a method includes the method of Example 11. Further, the offset length of time is determined based on a determination that the first wireless link and the second wireless link are associated with different respective logical groupings with respect to one or more antenna arrays of the UE device.

Example 14: a method includes the method of Example 1. Further, the method also includes: subsequent to transmitting or receiving the second portion of data, modifying, by the UE device, the offset length of time; transmitting, by the UE device, an indication of the modified offset length of time to the wireless network; transmitting or receiving, by the UE device during a third time interval, a third portion of data to or from the wireless network though a third wireless link; and transmitting or receiving, by the UE device during a fourth time interval, a fourth portion of data to or from the wireless network though a fourth wireless link, where an end of third time interval is offset from a beginning of the fourth time interval by at least the modified offset length of time.

Example 15: a method includes the method of Example 1. Further, the method also includes: determining, by the UE device, a second offset length of time associated with receiving data over the wireless network; transmitting, by the UE device, an indication of the second offset length of time to the wireless network; receiving, by the UE device during a third time interval, a third portion of data to the wireless network though a third wireless link; and receiving, by the UE device during a fourth time interval, a fourth portion of data to the wireless network though a fourth wireless link, where an end of third time interval is offset from a beginning of the fourth time interval by at least the second offset length of time.

Example 16: a device includes: one or more processors; and memory storing instructions that when executed by the one or more processors, cause the one or more processors to perform various operations. The operations include: determining, by a user equipment (UE) device, an offset length of time associated with transmitting or receiving data over a wireless network; transmitting, by the UE device, an indication of the offset length of time to the wireless network; transmitting or receiving, by the UE device during a first time interval, a first portion of data to or from the wireless network though a first wireless link; and transmitting or receiving, by the UE device during a second time interval, a second portion of data to or from the wireless network though a second wireless link, where an end of first time interval is offset from a beginning of the second time interval by the offset length of time.

Example 17: a device includes the device of Example 16. Further, the first portion of data is identical to the second portion of data.

Example 18: a device includes the device of Example 16. Further, the first portion of data corresponds to a first physical downlink shared channel (PDSCH), and the second portion of data corresponds to a second PDSCH.

Example 19: a device includes the device of Example 16. Further, the first wireless link corresponds to a first beam generated by first antenna array of the UE device, and the second wireless link corresponds to a second beam generated by the first antenna array.

Example 20: a device includes the device of Example 16. Further, the first wireless link corresponds to a first beam generated by first antenna array of the UE device, and the second wireless link corresponds to a second beam generated by a second antenna array of the UE device.

Example 21: a device includes the device of Example 16. Further, the first portion of data and the second portion of data are transmitted within a same slot with respect to a time domain.

Example 22: a device includes the device of Example 16. Further, the first portion of data and the second portion of data are transmitted during different respective slots with respect to a time domain.

Example 23: a device includes the device of Example 16. Further, the offset length of time is expressed as a number of network transmission symbols.

Example 24: a device includes the device of Example 16. Further, the offset length of time is expressed in a unit of time.

Example 25: a device includes the device of Example 16. Further, the determining the offset length of time includes selecting the offset length of time from a plurality of candidate offset lengths of time.

Example 26: a device includes the device of Example 16. Further, the offset length of time is determined based on one or more characteristics of the first wireless link and the second wireless link.

Example 27: a device includes the device of Example 26. Further, the offset length of time is determined based on a determination that the first wireless link and the second wireless link are associated with a common logical grouping with respect to one or more antenna arrays of the UE device.

Example 28: a device includes the device of Example 26. Further, the offset length of time is determined based on a determination that the first wireless link and the second wireless link are associated with different respective logical groupings with respect to one or more antenna arrays of the UE device.

Example 29: a device includes the device of Example 16. Further, the operation also include: subsequent to transmitting or receiving the second portion of data, modifying, by the UE device, the offset length of time; transmitting, by the UE device, an indication of the modified offset length of time to the wireless network; transmitting or receiving, by the UE device during a third time interval, a third portion of data to or from the wireless network though a third wireless link; and transmitting or receiving, by the UE device during a fourth time interval, a fourth portion of data to or from the wireless network though a fourth wireless link, where an end of third time interval is offset from a beginning of the fourth time interval by at least the modified offset length of time.

Example 30: a device includes the device of Example 16. Further, the operations also include: determining, by the UE device, a second offset length of time associated with receiving data over the wireless network; transmitting, by the UE device, an indication of the second offset length of time to the wireless network; receiving, by the UE device during a third time interval, a third portion of data to the wireless network though a third wireless link; and receiving, by the UE device during a fourth time interval, a fourth portion of data to the wireless network though a fourth wireless link, where an end of third time interval is offset from a beginning of the fourth time interval by at least the second offset length of time.

Example 31: a non-transitory, computer-readable storage medium has instructions stored thereon, that when executed by one or more processors, cause the one or more processors to perform various operations. The operations include: determining, by a user equipment (UE) device, an offset length of time associated with transmitting or receiving data over a wireless network; transmitting, by the UE device, an indication of the offset length of time to the wireless network; transmitting or receiving, by the UE device during a first time interval, a first portion of data to or from the wireless network though a first wireless link; and transmitting or receiving, by the UE device during a second time interval, a second portion of data to or from the wireless network though a second wireless link, where an end of first time interval is offset from a beginning of the second time interval by the offset length of time.

Example 32: a non-transitory, computer-readable storage medium includes the non-transitory, computer-readable storage medium of Example 31. Further, the first portion of data is identical to the second portion of data.

Example 33: a non-transitory, computer-readable storage medium includes the non-transitory, computer-readable storage medium of Example 31. Further, the first portion of data corresponds to a first physical downlink shared channel (PDSCH), and the second portion of data corresponds to a second PDSCH.

Example 34: a non-transitory, computer-readable storage medium includes the non-transitory, computer-readable storage medium of Example 31. Further, the first wireless link corresponds to a first beam generated by first antenna array of the UE device, and the second wireless link corresponds to a second beam generated by the first antenna array.

Example 35: a non-transitory, computer-readable storage medium includes the non-transitory, computer-readable storage medium of Example 31. Further, the first wireless link corresponds to a first beam generated by first antenna array of the UE device, and the second wireless link corresponds to a second beam generated by a second antenna array of the UE device.

Example 36: a non-transitory, computer-readable storage medium includes the non-transitory, computer-readable storage medium of Example 31. Further, the first portion of data and the second portion of data are transmitted within a same slot with respect to a time domain.

Example 37: a non-transitory, computer-readable storage medium includes the non-transitory, computer-readable storage medium of Example 31. Further, the first portion of data and the second portion of data are transmitted during different respective slots with respect to a time domain.

Example 38: a non-transitory, computer-readable storage medium includes the non-transitory, computer-readable storage medium of Example 31. Further, the offset length of time is expressed as a number of network transmission symbols.

Example 39: a non-transitory, computer-readable storage medium includes the non-transitory, computer-readable storage medium of Example 31. Further, the offset length of time is expressed in a unit of time.

Example 40: a non-transitory, computer-readable storage medium includes the non-transitory, computer-readable storage medium of Example 31. Further, the determining the offset length of time includes selecting the offset length of time from a plurality of candidate offset lengths of time.

Example 41: a non-transitory, computer-readable storage medium includes the non-transitory, computer-readable storage medium of Example 31. Further, the offset length of time is determined based on one or more characteristics of the first wireless link and the second wireless link.

Example 42: a non-transitory, computer-readable storage medium includes the non-transitory, computer-readable storage medium of Example 41. Further, the offset length of time is determined based on a determination that the first wireless link and the second wireless link are associated with a common logical grouping with respect to one or more antenna arrays of the UE device.

Example 43: a non-transitory, computer-readable storage medium includes the non-transitory, computer-readable storage medium of Example 41. Further, the offset length of time is determined based on a determination that the first wireless link and the second wireless link are associated with different respective logical groupings with respect to one or more antenna arrays of the UE device.

Example 44: a non-transitory, computer-readable storage medium includes the non-transitory, computer-readable storage medium of Example 31. Further, the operations also include: subsequent to transmitting or receiving the second portion of data, modifying, by the UE device, the offset length of time; transmitting, by the UE device, an indication of the modified offset length of time to the wireless network; transmitting or receiving, by the UE device during a third time interval, a third portion of data to or from the wireless network though a third wireless link; and transmitting or receiving, by the UE device during a fourth time interval, a fourth portion of data to or from the wireless network though a fourth wireless link, where an end of third time interval is offset from a beginning of the fourth time interval by at least the modified offset length of time.

Example 45: a non-transitory, computer-readable storage medium includes the non-transitory, computer-readable storage medium of Example 31. Further, the operations also include: determining, by the UE device, a second offset length of time associated with receiving data over the wireless network; transmitting, by the UE device, an indication of the second offset length of time to the wireless network; receiving, by the UE device during a third time interval, a third portion of data to the wireless network though a third wireless link; and receiving, by the UE device during a fourth time interval, a fourth portion of data to the wireless network though a fourth wireless link, where an end of third time interval is offset from a beginning of the fourth time interval by at least the second offset length of time.

Example 46: a method includes: receiving, by a base station from a user equipment (UE) device over a wireless network, an indication of the offset length of time associated with transmitting or receiving data over the wireless network; transmitting or receiving, by the base station during a first time interval, a first portion of data to or from the UE device over the wireless network though a first wireless link; and transmitting or receiving, by the base station during a second time interval, a second portion of data to or from the UE device over the wireless network though a second wireless link, where an end of first time interval is offset from a beginning of the second time interval by the offset length of time.

Example 47: a method includes the method of Example 46. Further, the first portion of data is identical to the second portion of data.

Example 48: a method includes the method of Example 46. Further, the first portion of data corresponds to a first physical downlink shared channel (PDSCH), and the second portion of data corresponds to a second PDSCH.

Example 49: a method includes the method of Example 46. Further, the first wireless link corresponds to a first beam generated by first antenna array of the UE device, and the second wireless link corresponds to a second beam generated by the first antenna array.

Example 50: a method includes the method of Example 46. Further, the first wireless link corresponds to a first beam generated by first antenna array of the UE device, and the second wireless link corresponds to a second beam generated by a second antenna array of the UE device.

Example 51: a method includes the method of Example 46. Further, the first portion of data and the second portion of data are transmitted within a same slot with respect to a time domain.

Example 52: a method includes the method of Example 46. Further, the first portion of data and the second portion of data are transmitted during different respective slots with respect to a time domain.

Example 53: a method includes the method of Example 46. Further, the offset length of time is expressed as a number of network transmission symbols.

Example 54: a method includes the method of Example 46. Further, the offset length of time is expressed in a unit of time.

Example 55: a method includes the method of Example 46. Further, the UE device determines the offset length of time by selecting the offset length of time from a plurality of candidate offset lengths of time.

Example 56: a method includes the method of Example 46. Further, the UE device determines the offset length of time based on one or more characteristics of the first wireless link and the second wireless link.

Example 57: a method includes the method of Example 56. Further, the UE device determines the offset length of time based on a determination that the first wireless link and the second wireless link are associated with a common logical grouping with respect to one or more antenna arrays of the UE device.

Example 58: a method includes the method of Example 56. Further, the UE device determines the offset length of time based on a determination that the first wireless link and the second wireless link are associated with different respective logical groupings with respect to one or more antenna arrays of the UE device.

Example 59: a method includes the method of Example 46. Further, the method also includes: subsequent to transmitting or receiving the second portion of data, receiving, by the base station from the UE device, an indication of a modified offset length of time; transmitting or receiving, by the base station during a third time interval, a third portion of data to or from the UE device over the wireless network though a third wireless link; and transmitting or receiving, by the base station during a fourth time interval, a fourth portion of data to or from the UE device over the wireless network though a fourth wireless link, where an end of third time interval is offset from a beginning of the fourth time interval by at least the modified offset length of time.

Example 60: a method includes the method of Example 46. Further, the method also includes: receiving, by the station from the UE device, an indication of a second offset length of time associated with receiving data over the wireless network; receiving, by the base station during a third time interval, a third portion of data from the UE device over the wireless network though a third wireless link; and receiving, by the base station during a fourth time interval, a fourth portion of data from the UE device from the wireless network though a fourth wireless link, where an end of third time interval is offset from a beginning of the fourth time interval by at least the second offset length of time.

Example 61: a device includes: one or more processors; and memory storing instructions that when executed by the one or more processors, cause the one or more processors to perform various operations. The operations include: receiving, by a base station from a user equipment (UE) device over a wireless network, an indication of the offset length of time associated with transmitting or receiving data over the wireless network; transmitting or receiving, by the base station during a first time interval, a first portion of data to or from the UE device over the wireless network though a first wireless link; and transmitting or receiving, by the base station during a second time interval, a second portion of data to or from the UE device over the wireless network though a second wireless link, where an end of first time interval is offset from a beginning of the second time interval by the offset length of time.

Example 62: a device includes the device of Example 61. Further, the first portion of data is identical to the second portion of data.

Example 63: a device includes the device of Example 61. Further, the first portion of data corresponds to a first physical downlink shared channel (PDSCH), and the second portion of data corresponds to a second PDSCH.

Example 64: a device includes the device of Example 61. Further, the first wireless link corresponds to a first beam generated by first antenna array of the UE device, and the second wireless link corresponds to a second beam generated by the first antenna array.

Example 65: a device includes the device of Example 61. Further, the first wireless link corresponds to a first beam generated by first antenna array of the UE device, and the second wireless link corresponds to a second beam generated by a second antenna array of the UE device.

Example 66: a device includes the device of Example 61. Further, the first portion of data and the second portion of data are transmitted within a same slot with respect to a time domain.

Example 67: a device includes the device of Example 61. Further, the first portion of data and the second portion of data are transmitted during different respective slots with respect to a time domain.

Example 68: a device includes the device of Example 61. Further, the offset length of time is expressed as a number of network transmission symbols.

Example 69: a device includes the device of Example 61. Further, the offset length of time is expressed in a unit of time.

Example 70: a device includes the device of Example 61. Further, the determining the offset length of time includes selecting the offset length of time from a plurality of candidate offset lengths of time.

Example 71: a device includes the device of Example 61. Further, the UE device determines the offset length of time based on one or more characteristics of the first wireless link and the second wireless link.

Example 72: a device includes the device of Example 71. Further, the UE device determines the offset length of time based on a determination that the first wireless link and the second wireless link are associated with a common logical grouping with respect to one or more antenna arrays of the UE device.

Example 73: a device includes the device of Example 71. Further, the UE device determines the offset length of time based on a determination that the first wireless link and the second wireless link are associated with different respective logical groupings with respect to one or more antenna arrays of the UE device.

Example 74: a device includes the device of Example 61. Further, the operations also include: subsequent to transmitting or receiving the second portion of data, receiving, by the base station from the UE device, an indication of a modified offset length of time; transmitting or receiving, by the base station during a third time interval, a third portion of data to or from the UE device over the wireless network though a third wireless link; and transmitting or receiving, by the base station during a fourth time interval, a fourth portion of data to or from the UE device over the wireless network though a fourth wireless link, where an end of third time interval is offset from a beginning of the fourth time interval by at least the modified offset length of time.

Example 75: a device includes the device of Example 61. Further, the operations also include: receiving, by the station from the UE device, an indication of a second offset length of time associated with receiving data over the wireless network; receiving, by the base station during a third time interval, a third portion of data from the UE device over the wireless network though a third wireless link; and receiving, by the base station during a fourth time interval, a fourth portion of data from the UE device from the wireless network though a fourth wireless link, where an end of third time interval is offset from a beginning of the fourth time interval by at least the second offset length of time.

Example 76: a non-transitory, computer-readable storage medium has instructions stored thereon, that when executed by one or more processors, cause the one or more processors to perform various operations. The operations include: receiving, by a base station from a user equipment (UE) device over a wireless network, an indication of the offset length of time associated with transmitting or receiving data over the wireless network; transmitting or receiving, by the base station during a first time interval, a first portion of data to or from the UE device over the wireless network though a first wireless link; and transmitting or receiving, by the base station during a second time interval, a second portion of data to or from the UE device over the wireless network though a second wireless link, where an end of first time interval is offset from a beginning of the second time interval by the offset length of time.

Example 77: a non-transitory, computer-readable storage medium includes the non-transitory, computer-readable storage medium of Example 76. Further, the first portion of data is identical to the second portion of data.

Example 78: a non-transitory, computer-readable storage medium includes the non-transitory, computer-readable storage medium of Example 76. Further, the first portion of data corresponds to a first physical downlink shared channel (PDSCH), and the second portion of data corresponds to a second PDSCH.

Example 79: a non-transitory, computer-readable storage medium includes the non-transitory, computer-readable storage medium of Example 76. Further, the first wireless link corresponds to a first beam generated by first antenna array of the UE device, and the second wireless link corresponds to a second beam generated by the first antenna array.

Example 80: a non-transitory, computer-readable storage medium includes the non-transitory, computer-readable storage medium of Example 76. Further, the first wireless link corresponds to a first beam generated by first antenna array of the UE device, and the second wireless link corresponds to a second beam generated by a second antenna array of the UE device.

Example 81: a non-transitory, computer-readable storage medium includes the non-transitory, computer-readable storage medium of Example 76. Further, the first portion of data and the second portion of data are transmitted within a same slot with respect to a time domain.

Example 82: a non-transitory, computer-readable storage medium includes the non-transitory, computer-readable storage medium of Example 76. Further, the first portion of data and the second portion of data are transmitted during different respective slots with respect to a time domain.

Example 83: a non-transitory, computer-readable storage medium includes the non-transitory, computer-readable storage medium of Example 76. Further, the offset length of time is expressed as a number of network transmission symbols.

Example 84: a non-transitory, computer-readable storage medium includes the non-transitory, computer-readable storage medium of Example 76. Further, the offset length of time is expressed in a unit of time.

Example 85: a non-transitory, computer-readable storage medium includes the non-transitory, computer-readable storage medium of Example 76. Further, the determining the offset length of time includes selecting the offset length of time from a plurality of candidate offset lengths of time.

Example 86: a non-transitory, computer-readable storage medium includes the non-transitory, computer-readable storage medium of Example 76. Further, the UE device determines the offset length of time based on one or more characteristics of the first wireless link and the second wireless link.

Example 87: a non-transitory, computer-readable storage medium includes the non-transitory, computer-readable storage medium of Example 86. Further, the UE device determines the offset length of time based on a determination that the first wireless link and the second wireless link are associated with a common logical grouping with respect to one or more antenna arrays of the UE device.

Example 88: a non-transitory, computer-readable storage medium includes the non-transitory, computer-readable storage medium of Example 86. Further, the UE device determines the offset length of time based on a determination that the first wireless link and the second wireless link are associated with different respective logical groupings with respect to one or more antenna arrays of the UE device.

Example 89: a non-transitory, computer-readable storage medium includes the non-transitory, computer-readable storage medium of Example 76. Further, the operations also include: subsequent to transmitting or receiving the second portion of data, receiving, by the base station from the UE device, an indication of a modified offset length of time; transmitting or receiving, by the base station during a third time interval, a third portion of data to or from the UE device over the wireless network though a third wireless link; and transmitting or receiving, by the base station during a fourth time interval, a fourth portion of data to or from the UE device over the wireless network though a fourth wireless link, where an end of third time interval is offset from a beginning of the fourth time interval by at least the modified offset length of time.

Example 90: a non-transitory, computer-readable storage medium includes the non-transitory, computer-readable storage medium of Example 76. Further, the operations also include: receiving, by the station from the UE device, an indication of a second offset length of time associated with receiving data over the wireless network; receiving, by the base station during a third time interval, a third portion of data from the UE device over the wireless network though a third wireless link; and receiving, by the base station during a fourth time interval, a fourth portion of data from the UE device from the wireless network though a fourth wireless link, where an end of third time interval is offset from a beginning of the fourth time interval by at least the second offset length of time.

Example 91: a method includes: receiving, by a user equipment (UE) device from a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; determining, by the UE device, that the scheduling exceeds a capability of the UE device; and responsive to determining that the scheduling exceeds a capability of the UE device, performing at least one of: transmitting, by the UE device, data to the wireless network according to a modified scheduling, or receiving, by the UE device, data from the wireless network according to the modified scheduling.

Example 92: a method includes the method of Example 91. Further, the control information includes an indication that the first portion of data is to be transmitted during a first time interval and the second portion of data is to be transmitted during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 93: a method includes the method of Example 91. Further, the control information includes an indication that the first portion of data is to be received during a first time interval and the second portion of data is to be received during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 94: a method includes the method of Example 91. Further, transmitting data to the wireless network according to the modified scheduling includes: transmitting the first portion of the data to the wireless network in accordance with the scheduling indicated by the control data, and not transmitting the second portion of data to the wireless network.

Example 95: a method includes the method of Example 91. Further, receiving data from the wireless network according to the modified scheduling includes: receiving the first portion of the data from the wireless network in accordance with the scheduling indicated by the control data, and not receiving the second portion of data from the wireless network.

Example 96: a method includes the method of Example 91. Further, transmitting data to the wireless network according to the modified scheduling includes transmitting the first portion of data and the second portion of data according to a common beam.

Example 97: a method includes the method of Example 96. Further, the common beam is selected based on at least one of: a control resource set (CORESET) having a lowest logical index from among a plurality of CORESETs configured for use with respect to the wireless network, a CORESET most recently used by the UE device to monitor for transmission from the wireless network, or an active transmission configuration indicator (TCI) state having a lowest logical index from among a plurality of TCI states of the UE device.

Example 98: a method includes the method of Example 91. Further, receiving data from the wireless network according to the modified scheduling includes receiving the first portion of data and the second portion of data according to a common beam.

Example 99: a method includes the method of Example 98. Further, the common beam is selected based on at least one of: a control resource set (CORESET) having a lowest logical index from another a plurality of CORESETs configured for use by the wireless network, a CORESET most recently used by the UE device to monitor for transmission from the wireless network, or an active transmission configuration indicator (TCI) state having a lowest logical index from among a plurality of TCI states of the UE device.

Example 100: a method includes the method of Example 91. Further, the first portion of data corresponds to a first physical downlink shared channel (PDSCH), and the second portion of data corresponds to a second PDSCH.

Example 101: a device includes: one or more processors; and memory storing instructions that when executed by the one or more processors, cause the one or more processors to perform various operations. The operations include: receiving, by a user equipment (UE) device from a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; determining, by the UE device, that the scheduling exceeds a capability of the UE device; and responsive to determining that the scheduling exceeds a capability of the UE device, performing at least one of: transmitting, by the UE device, data to the wireless network according to a modified scheduling, or receiving, by the UE device, data from the wireless network according to the modified scheduling.

Example 102: a device includes the device of Example 101. Further, the control information includes an indication that the first portion of data is to be transmitted during a first time interval and the second portion of data is to be transmitted during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 103: a device includes the device of Example 101. Further, the control information includes an indication that the first portion of data is to be received during a first time interval and the second portion of data is to be received during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 104: a device includes the device of Example 101. Further, transmitting data to the wireless network according to the modified scheduling includes: transmitting the first portion of the data to the wireless network in accordance with the scheduling indicated by the control data, and not transmitting the second portion of data to the wireless network.

Example 105: a device includes the device of Example 101. Further, receiving data from the wireless network according to the modified scheduling includes: receiving the first portion of the data from the wireless network in accordance with the scheduling indicated by the control data, and not receiving the second portion of data from the wireless network.

Example 106: a device includes the device of Example 101. Further, transmitting data to the wireless network according to the modified scheduling includes transmitting the first portion of data and the second portion of data according to a common beam.

Example 107: a device includes the device of Example 106. Further, the common beam is selected based on at least one of: a control resource set (CORESET) having a lowest logical index from among a plurality of CORESETs configured for use with respect to the wireless network, a CORESET most recently used by the UE device to monitor for transmission from the wireless network, or an active transmission configuration indicator (TCI) state having a lowest logical index from among a plurality of TCI states of the UE device.

Example 108: a device includes the device of Example 101. Further, receiving data from the wireless network according to the modified scheduling includes receiving the first portion of data and the second portion of data according to a common beam.

Example 109: a device includes the device of Example 108. Further, the common beam is selected based on at least one of: a control resource set (CORESET) having a lowest logical index from another a plurality of CORESETs configured for use by the wireless network, a CORESET most recently used by the UE device to monitor for transmission from the wireless network, or an active transmission configuration indicator (TCI) state having a lowest logical index from among a plurality of TCI states of the UE device.

Example 110: a device includes the device of Example 101. Further, the first portion of data corresponds to a first physical downlink shared channel (PDSCH), and the second portion of data corresponds to a second PDSCH.

Example 111: a non-transitory, computer-readable storage medium has instructions stored thereon, that when executed by one or more processors, cause the one or more processors to perform various operations. The operations include: receiving, by a user equipment (UE) device from a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; determining, by the UE device, that the scheduling exceeds a capability of the UE device; and responsive to determining that the scheduling exceeds a capability of the UE device, performing at least one of: transmitting, by the UE device, data to the wireless network according to a modified scheduling, or receiving, by the UE device, data from the wireless network according to the modified scheduling.

Example 112: a non-transitory, computer-readable storage medium includes the non-transitory, computer-readable storage medium of Example 111. Further, the control information includes an indication that the first portion of data is to be transmitted during a first time interval and the second portion of data is to be transmitted during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 113: a non-transitory, computer-readable storage medium includes the non-transitory, computer-readable storage medium of Example 111. Further, the control information includes an indication that the first portion of data is to be received during a first time interval and the second portion of data is to be received during a second time interval, where an end of first time interval is offset from a beginning of the second time interval by the offset length of time, and where determining that the scheduling exceeds the capability of the UE device includes determining that the offset length of time is less than a minimum offset length of time associated with the UE device.

Example 114: a non-transitory, computer-readable storage medium includes the non-transitory, computer-readable storage medium of Example 111. Further, transmitting data to the wireless network according to the modified scheduling includes: transmitting the first portion of the data to the wireless network in accordance with the scheduling indicated by the control data, and not transmitting the second portion of data to the wireless network.

Example 115: a non-transitory, computer-readable storage medium includes the non-transitory, computer-readable storage medium of Example 111. Further, receiving data from the wireless network according to the modified scheduling includes: receiving the first portion of the data from the wireless network in accordance with the scheduling indicated by the control data, and not receiving the second portion of data from the wireless network.

Example 116: a non-transitory, computer-readable storage medium includes the non-transitory, computer-readable storage medium of Example 111. Further, transmitting data to the wireless network according to the modified scheduling includes transmitting the first portion of data and the second portion of data according to a common beam.

Example 117: a non-transitory, computer-readable storage medium includes the non-transitory, computer-readable storage medium of Example 116. Further, the common beam is selected based on at least one of: a control resource set (CORESET) having a lowest logical index from among a plurality of CORESETs configured for use with respect to the wireless network, a CORESET most recently used by the UE device to monitor for transmission from the wireless network, or an active transmission configuration indicator (TCI) state having a lowest logical index from among a plurality of TCI states of the UE device.

Example 118: a non-transitory, computer-readable storage medium includes the non-transitory, computer-readable storage medium of Example 111. Further, receiving data from the wireless network according to the modified scheduling includes receiving the first portion of data and the second portion of data according to a common beam.

Example 119: a non-transitory, computer-readable storage medium includes the non-transitory, computer-readable storage medium of Example 118. Further, the common beam is selected based on at least one of: a control resource set (CORESET) having a lowest logical index from another a plurality of CORESETs configured for use by the wireless network, a CORESET most recently used by the UE device to monitor for transmission from the wireless network, or an active transmission configuration indicator (TCI) state having a lowest logical index from among a plurality of TCI states of the UE device.

Example 120: a non-transitory, computer-readable storage medium includes the non-transitory, computer-readable storage medium of Example 111. Further, the first portion of data corresponds to a first physical downlink shared channel (PDSCH), and the second portion of data corresponds to a second PDSCH.

Example 121: a method includes: transmitting, by a base station to a user equipment (UE) device over a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; and responsive to the UE device determining the scheduling exceeds a capability of the UE device, performing at least one of: transmitting, by the base station, data to the UE device over the wireless network according to a modified scheduling, or receiving, by the base station, data to the UE device over the wireless network according to the modified scheduling.

Example 122: a method includes the method of Example 121. Further, the control information includes an indication that the first portion of data is to be transmitted during a first time interval and the second portion of data is to be transmitted during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 123: a method includes the method of Example 121. Further, the control information includes an indication that the first portion of data is to be received during a first time interval and the second portion of data is to be received during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 124: a method includes the method of Example 121. Further, the first portion of data corresponds to a first physical downlink shared channel (PDSCH), and the second portion of data corresponds to a second PDSCH.

Example 125: a device includes: one or more processors; and memory storing instructions that when executed by the one or more processors, cause the one or more processors to perform various operations. The operations include: transmitting, by a base station to a user equipment (UE) device over a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; and responsive to the UE device determining the scheduling exceeds a capability of the UE device, performing at least one of: transmitting, by the base station, data to the UE device over the wireless network according to a modified scheduling, or receiving, by the base station, data to the UE device over the wireless network according to the modified scheduling.

Example 126: a device includes the device of Example 125. Further, the control information includes an indication that the first portion of data is to be transmitted during a first time interval and the second portion of data is to be transmitted during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 127: a device includes the device of Example 125. Further, the control information includes an indication that the first portion of data is to be received during a first time interval and the second portion of data is to be received during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 128: a device includes the device of Example 125. Further, the first portion of data corresponds to a first physical downlink shared channel (PDSCH), and the second portion of data corresponds to a second PDSCH.

Example 129: a non-transitory, computer-readable storage medium has instructions stored thereon, that when executed by one or more processors, cause the one or more processors to perform various operations. The operations include: transmitting, by a base station to a user equipment (UE) device over a wireless network, control information indicating a scheduling of at least one of a transmission of data to the wireless network or a receipt of data from the wireless network, where the transmission or the receipt of data includes: a transmission or receipt of a first portion of data according to a first beam, and a transmission or receipt of a second portion of data according to a second beam; and responsive to the UE device determining the scheduling exceeds a capability of the UE device, performing at least one of: transmitting, by the base station, data to the UE device over the wireless network according to a modified scheduling, or receiving, by the base station, data to the UE device over the wireless network according to the modified scheduling, Example 130: a non-transitory, computer-readable storage medium includes the non-transitory, computer-readable storage medium of Example 129. Further, the control information includes an indication that the first portion of data is to be transmitted during a first time interval and the second portion of data is to be transmitted during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 131: a non-transitory, computer-readable storage medium includes the non-transitory, computer-readable storage medium of Example 129. Further, the control information includes an indication that the first portion of data is to be received during a first time interval and the second portion of data is to be received during a second time interval, where an end of first time interval is offset from a beginning of the second time interval by the offset length of time, and where the UE device determines that the scheduling exceeds the capability of the UE device by determining that the offset length of time is less than a minimum offset length of time associated with the UE device.

Example 132: a non-transitory, computer-readable storage medium includes the non-transitory, computer-readable storage medium of Example 129. Further, the first portion of data corresponds to a first physical downlink shared channel (PDSCH), and the second portion of data corresponds to a second PDSCH.

Example 133: a method includes: initiating transmission, from a first network device to a second network device, of a sequence of data over a wireless network according to a network schedule, where according to the network schedule, a portion of data is to be periodically transmitted multiple times; receiving, by the first network device from the second network device, an indication to terminate the transmission of the sequence of data; and responsive to receiving the indication, terminating, by the first network device, the transmission of the sequence of data to the second network device.

Example 134: a method includes the method of Example 133. Further, terminating the transmission of the sequence of data includes terminating the periodic transmission of the portion of data.

Example 135: a method includes the method of Example 133. Further, the indication is received via a physical uplink control channel (PUCCH).

Example 136: a method includes the method of Example 133. Further, the indication is received via a physical channel configured to indicate a successful reception of data over the wireless network.

Example 137: a method includes the method of Example 133. Further, the indication is received via downlink control information (DCI) transmitted by the second network device.

Example 138: a device includes: one or more processors; and memory storing instructions that when executed by the one or more processors, cause the one or more processors to perform various operations. The operations include: initiating transmission, from a first network device to a second network device, of a sequence of data over a wireless network according to a network schedule, where according to the network schedule, a portion of data is to be periodically transmitted multiple times; receiving, by the first network device from the second network device, an indication to terminate the transmission of the sequence of data; and responsive to receiving the indication, terminating, by the first network device, the transmission of the sequence of data to the second network device.

Example 139: a device includes the device of Example 138. Further, terminating the transmission of the sequence of data includes terminating the periodic transmission of the portion of data.

Example 140: a device includes the device of Example 138. Further, the indication is received via a physical uplink control channel (PUCCH).

Example 141: a device includes the device of Example 138. Further, the indication is received via a physical channel configured to indicate a successful reception of data over the wireless network.

Example 142: a device includes the device of Example 138. Further, the indication is received via downlink control information (DCI) transmitted by the second network device.

Example 143: a non-transitory, computer-readable storage medium has instructions stored thereon, that when executed by one or more processors, cause the one or more processors to perform various operations. The operations include: initiating transmission, from a first network device to a second network device, of a sequence of data over a wireless network according to a network schedule, where according to the network schedule, a portion of data is to be periodically transmitted multiple times; receiving, by the first network device from the second network device, an indication to terminate the transmission of the sequence of data; and responsive to receiving the indication, terminating, by the first network device, the transmission of the sequence of data to the second network device.

Example 144: a non-transitory, computer-readable storage medium includes the non-transitory, computer-readable storage medium of Example 143. Further, terminating the transmission of the sequence of data includes terminating the periodic transmission of the portion of data.

Example 145: a non-transitory, computer-readable storage medium includes the non-transitory, computer-readable storage medium of Example 143. Further, the indication is received via a physical uplink control channel (PUCCH).

Example 146: a non-transitory, computer-readable storage medium includes the non-transitory, computer-readable storage medium of Example 143. Further, the indication is received via a physical channel configured to indicate a successful reception of data over the wireless network.

Example 147: a non-transitory, computer-readable storage medium includes the non-transitory, computer-readable storage medium of Example 143. Further, the indication is received via downlink control information (DCI) transmitted by the second network device.

Example 148: a method includes: determining, by a user equipment (UE) device, that data is to be transmitted to a wireless network according to a first transmission scheme, where according to the first transmission scheme, a first instance of the data and a second instance of the data are to be transmitted within a first slot with respect to a time domain, and where the first instance of the data is identical to the second instance of the data; determining, by the UE device, that the first instance of the data and the second instance of the data cannot be fully transmitted within the first slot; and responsive to determining that the first instance of the data and the second instance of the data cannot be fully transmitted within the first slot, transmitting the first instance of the data and the second instance of data according to a modified transmission scheme.

Example 149: a method includes the method of Example 148. Further, determining that the first instance of the data and the second instance of the data cannot be fully transmitted within the first slot includes determining that the transmission of the first instance of the data and the second instance of the data would exceed a length of time of the first slot.

Example 150: a method includes the method of Example 148. Further, transmitting the first instance of the data and the second instance of data according to the modified transmission scheme includes transmitting only the first instance of the data during the first slot.

Example 151: a method includes the method of Example 148. Further, transmitting the first instance of the data and the second instance of data according to the modified transmission scheme includes: transmitting the first instance of the data during the first slot; and transmitting the second instance of the data during the first slot and a second slot with respect to the time domain immediately subsequent to the first slot.

Example 152: a method includes the method of Example 148. Further, transmitting the first instance of the data and the second instance of data according to the modified transmission scheme includes: transmitting the first instance of the data during the first slot; truncating the second instance of the data; and transmitting the truncated second instance of the data during the first slot.

Example 153: a method includes: determining, by a user equipment (UE) device, that data is to be received from a wireless network according to a first transmission scheme, where according to the first transmission scheme, a first instance of the data and a second instance of the data are to be received within a first slot with respect to a time domain, and where the first instance of the data is identical to the second instance of the data; determining, by the UE device, that the first instance of the data and the second instance of the data cannot be fully received within the first slot; and responsive to determining that the first instance of the data and the second instance of the data cannot be fully received within the first slot, receiving the first instance of the data and the second instance of data according to a modified receipt scheme.

Example 154: a method includes the method of Example 153. Further, determining that the first instance of the data and the second instance of the data cannot be fully received within the first slot includes determining that the receipt of the first instance of the data and the second instance of the data would exceed a length of time of the first slot.

Example 155: a method includes the method of Example 153. Further, receiving the first instance of the data and the second instance of data according to the modified transmission scheme includes receiving only the first instance of the data during the first slot.

Example 156: a method includes the method of Example 153. Further, receiving the first instance of the data and the second instance of data according to the modified transmission scheme includes: receiving the first instance of the data during the first slot; and receiving the second instance of the data during the first slot and a second slot with respect to the time domain immediately subsequent to the first slot.

Example 157: a device includes: one or more processors; and memory storing instructions that when executed by the one or more processors, cause the one or more processors to perform various operations. The operations include: determining, by a user equipment (UE) device, that data is to be transmitted to a wireless network according to a first transmission scheme, where according to the first transmission scheme, a first instance of the data and a second instance of the data are to be transmitted within a first slot with respect to a time domain, and where the first instance of the data is identical to the second instance of the data; determining, by the UE device, that the first instance of the data and the second instance of the data cannot be fully transmitted within the first slot; and responsive to determining that the first instance of the data and the second instance of the data cannot be fully transmitted within the first slot, transmitting the first instance of the data and the second instance of data according to a modified transmission scheme.

Example 158: a device includes the device of Example 157. Further, determining that the first instance of the data and the second instance of the data cannot be fully transmitted within the first slot includes determining that the transmission of the first instance of the data and the second instance of the data would exceed a length of time of the first slot.

Example 159: a device includes the device of Example 157. Further, transmitting the first instance of the data and the second instance of data according to the modified transmission scheme includes transmitting only the first instance of the data during the first slot.

Example 160: a device includes the device of Example 157. Further, transmitting the first instance of the data and the second instance of data according to the modified transmission scheme includes: transmitting the first instance of the data during the first slot; and transmitting the second instance of the data during the first slot and a second slot with respect to the time domain immediately subsequent to the first slot.

Example 161: a device includes the device of Example 157. Further, transmitting the first instance of the data and the second instance of data according to the modified transmission scheme includes: transmitting the first instance of the data during the first slot; truncating the second instance of the data; and transmitting the truncated second instance of the data during the first slot.

Example 162: a device includes: one or more processors; and memory storing instructions that when executed by the one or more processors, cause the one or more processors to perform various operations. The operations include: determining, by a user equipment (UE) device, that data is to be received from a wireless network according to a first transmission scheme, where according to the first transmission scheme, a first instance of the data and a second instance of the data are to be received within a first slot with respect to a time domain, and where the first instance of the data is identical to the second instance of the data; determining, by the UE device, that the first instance of the data and the second instance of the data cannot be fully received within the first slot; and responsive to determining that the first instance of the data and the second instance of the data cannot be fully received within the first slot, receiving the first instance of the data and the second instance of data according to a modified receipt scheme.

Example 163: a device includes the device of Example 162. Further, determining that the first instance of the data and the second instance of the data cannot be fully received within the first slot includes determining that the receipt of the first instance of the data and the second instance of the data would exceed a length of time of the first slot.

Example 164: a device includes the device of Example 162. Further, receiving the first instance of the data and the second instance of data according to the modified transmission scheme includes receiving only the first instance of the data during the first slot.

Example 165: a device includes the device of Example 162. Further, receiving the first instance of the data and the second instance of data according to the modified transmission scheme includes: receiving the first instance of the data during the first slot; and receiving the second instance of the data during the first slot and a second slot with respect to the time domain immediately subsequent to the first slot.

Example 166: a non-transitory, computer-readable storage medium has instructions stored thereon, that when executed by one or more processors, cause the one or more processors to perform various operations. The operations include: determining, by a user equipment (UE) device, that data is to be transmitted to a wireless network according to a first transmission scheme, where according to the first transmission scheme, a first instance of the data and a second instance of the data are to be transmitted within a first slot with respect to a time domain, and where the first instance of the data is identical to the second instance of the data; determining, by the UE device, that the first instance of the data and the second instance of the data cannot be fully transmitted within the first slot; and responsive to determining that the first instance of the data and the second instance of the data cannot be fully transmitted within the first slot, transmitting the first instance of the data and the second instance of data according to a modified transmission scheme.

Example 167: a non-transitory, computer-readable storage medium includes the non-transitory, computer-readable storage medium of Example 166. Further, determining that the first instance of the data and the second instance of the data cannot be fully transmitted within the first slot includes determining that the transmission of the first instance of the data and the second instance of the data would exceed a length of time of the first slot.

Example 168: a non-transitory, computer-readable storage medium includes the non-transitory, computer-readable storage medium of Example 166. Further, transmitting the first instance of the data and the second instance of data according to the modified transmission scheme includes transmitting only the first instance of the data during the first slot.

Example 169: a non-transitory, computer-readable storage medium includes the non-transitory, computer-readable storage medium of Example 166. Further, transmitting the first instance of the data and the second instance of data according to the modified transmission scheme includes: transmitting the first instance of the data during the first slot; and transmitting the second instance of the data during the first slot and a second slot with respect to the time domain immediately subsequent to the first slot.

Example 170: a non-transitory, computer-readable storage medium includes the non-transitory, computer-readable storage medium of Example 166. Further, transmitting the first instance of the data and the second instance of data according to the modified transmission scheme includes: transmitting the first instance of the data during the first slot; truncating the second instance of the data; and transmitting the truncated second instance of the data during the first slot.

Example 171: a non-transitory, computer-readable storage medium has instructions stored thereon, that when executed by one or more processors, cause the one or more processors to perform various operations. The operations include: determining, by a user equipment (UE) device, that data is to be received from a wireless network according to a first transmission scheme, where according to the first transmission scheme, a first instance of the data and a second instance of the data are to be received within a first slot with respect to a time domain, and where the first instance of the data is identical to the second instance of the data; determining, by the UE device, that the first instance of the data and the second instance of the data cannot be fully received within the first slot; and responsive to determining that the first instance of the data and the second instance of the data cannot be fully received within the first slot, receiving the first instance of the data and the second instance of data according to a modified receipt scheme.

Example 172: a non-transitory, computer-readable storage medium includes the non-transitory, computer-readable storage medium of Example 171. Further, determining that the first instance of the data and the second instance of the data cannot be fully received within the first slot includes determining that the receipt of the first instance of the data and the second instance of the data would exceed a length of time of the first slot.

Example 173: a non-transitory, computer-readable storage medium includes the non-transitory, computer-readable storage medium of Example 171. Further, receiving the first instance of the data and the second instance of data according to the modified transmission scheme includes receiving only the first instance of the data during the first slot.

Example 174: a non-transitory, computer-readable storage medium includes the non-transitory, computer-readable storage medium of Example 171. Further, receiving the first instance of the data and the second instance of data according to the modified transmission scheme includes: receiving the first instance of the data during the first slot; and receiving the second instance of the data during the first slot and a second slot with respect to the time domain immediately subsequent to the first slot.

Example 175: a method includes: receiving, by a user equipment (UE) device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of: a first transmission scheme in which the data is transmitted multiple times within a same slot with respect to a time domain, or a second transmission scheme in which the data is transmitted multiple times during different respective slots with respect to the time domain; determining, by the UE device based on the control information, that the data is to be transmitted according to the transmission scheme and according to a dynamic point selection (DPS) configuration; and transmitting or receiving the data according to the transmission scheme and according to the DPS configuration.

Example 176: a method includes the method of Example 175. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 177: a method includes the method of Example 175. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 178: a method includes the method of Example 177. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 179: a method includes the method of Example 175. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 180: a method includes the method of Example 179. Further, the control information further includes an indication of a number of repetitions by which to transmit the data, the number of repetitions being greater than one, and the UE device determines, based on the control information, that the data is to be transmitted or received according to the second transmission scheme and according to the DPS configuration.

Example 181: a user equipment (UE) device includes: one or more processors; and memory storing instructions that when executed by the one or more processors, cause the UE device to perform various operations. The operations include: receiving, by the UE device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of: a first transmission scheme in which the data is transmitted multiple times within a same slot with respect to a time domain, or a second transmission scheme in which the data is transmitted multiple times during different respective slots with respect to the time domain; determining, by the UE device based on the control information, that the data is to be transmitted according to the transmission scheme and according to a dynamic point selection (DPS) configuration; and transmitting or receiving the data according to the transmission scheme and according to the DPS configuration.

Example 182: a device includes the device of Example 181. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 183: a device includes the device of Example 181. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 184: a device includes the device of Example 183. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 185: a device includes the device of Example 181. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 186: a device includes the device of Example 185. Further, the control information further includes an indication of a number of repetitions by which to transmit the data, the number of repetitions being greater than one, and the UE device determines, based on the control information, that the data is to be transmitted or received according to the second transmission scheme and according to the DPS configuration.

Example 187: a non-transitory, computer-readable storage medium has instructions stored thereon, that when executed by one or more processors, cause the one or more processors to perform various operations. The operations include: receiving, by a user equipment (UE) device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of: a first transmission scheme in which the data is transmitted multiple times within a same slot with respect to a time domain, or a second transmission scheme in which the data is transmitted multiple times during different respective slots with respect to the time domain; determining, by the UE device based on the control information, that the data is to be transmitted according to the transmission scheme and according to a dynamic point selection (DPS) configuration; and transmitting or receiving the data according to the transmission scheme and according to the DPS configuration.

Example 188: a non-transitory, computer-readable storage medium includes the non-transitory, computer-readable storage medium of Example 187. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 189: a non-transitory, computer-readable storage medium includes the non-transitory, computer-readable storage medium of Example 187. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 190: a non-transitory, computer-readable storage medium includes the non-transitory, computer-readable storage medium of Example 189. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 191: a non-transitory, computer-readable storage medium includes the non-transitory, computer-readable storage medium of Example 187. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 192: a non-transitory, computer-readable storage medium includes the non-transitory, computer-readable storage medium of Example 191. Further, the control information further includes an indication of a number of repetitions by which to transmit the data, the number of repetitions being greater than one, and the UE device determines, based on the control information, that the data is to be transmitted or received according to the second transmission scheme and according to the DPS configuration.

Example 193: a method includes: transmitting, from a base station to a user equipment (UE) device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of: a first transmission scheme in which the data is transmitted multiple times within a same slot with respect to a time domain, or a second transmission scheme in which the data is transmitted multiple times during different respective slots with respect to the time domain; receiving, at the base station from the UE device over the wireless network, or transmitting, from the base station to the UE device over the wireless work, data according to a transmission scheme and according to a dynamic point selection (DPS) configuration.

Example 194: a method includes the method of Example 193. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 195: a method includes the method of Example 193. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 196: a method includes the method of Example 195. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 197: a method includes the method of Example 193. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 198: a method includes the method of Example 197. Further, the control information further includes an indication of a number of repetitions by which to transmit the data, the number of repetitions being greater than one, and the UE device determines, based on the control information, that the data is to be transmitted or received according to the second transmission scheme and according to the DPS configuration.

Example 199: a device includes: one or more processors; and memory storing instructions that when executed by the one or more processors, cause the one or more processors to perform various operations. The operations include: transmitting, from a base station to a user equipment (UE) device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of: a first transmission scheme in which the data is transmitted multiple times within a same slot with respect to a time domain, or a second transmission scheme in which the data is transmitted multiple times during different respective slots with respect to the time domain; receiving, at the base station from the UE device over the wireless network, or transmitting, from the base station to the UE device over the wireless work, data according to a transmission scheme and according to a dynamic point selection (DPS) configuration.

Example 200: a device includes the device of Example 199. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 201: a device includes the device of Example 199. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 202: a device includes the device of Example 201. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 203: a device includes the device of Example 199. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 204: a device includes the device of Example 203. Further, the control information further includes an indication of a number of repetitions by which to transmit the data, the number of repetitions being greater than one, and the UE device determines, based on the control information, that the data is to be transmitted or received according to the second transmission scheme and according to the DPS configuration.

Example 205: a non-transitory, computer-readable storage medium has instructions stored thereon, that when executed by one or more processors, cause the one or more processors to perform various operations. The operations include: transmitting, from a base station to a user equipment (UE) device, control information regarding a transmission of data to a wireless network, the control information including: an indication of a number of transmission configuration indication (TCI) states associated with the transmission, an indication of a number of code division multiplexing (CDM) groups associated with the transmission, and an indication of a transmission scheme associated with the transmission, the transmission scheme being one of a first transmission scheme in which the data is transmitted multiple times within a same slot with respect to a time domain, or a second transmission scheme in which the data is transmitted multiple times during different respective slots with respect to the time domain; receiving, at the base station from the UE device over the wireless network, or transmitting, from the base station to the UE device over the wireless work, data according to a transmission scheme and according to a dynamic point selection (DPS) configuration.

Example 206: a non-transitory, computer-readable storage medium includes the non-transitory, computer-readable storage medium of Example 205. Further, transmitting or receiving the data according to the transmission scheme and according to the DPS configuration includes: selecting, by the UE device, a base station from among a plurality of base stations of the wireless network based on one or more quality metrics; generating, by the UE device using one or more antenna arrays, a beam directed to the selected base station; and transmitting or receiving, by the UE device, the data to or from the selected base station using the beam and according to the transmission scheme.

Example 207: a non-transitory, computer-readable storage medium includes the non-transitory, computer-readable storage medium of Example 205. Further, the control information indicates that the first transmission scheme, one TCI state, and one or more CDM groups are associated with the transmission, and the UE device determines, based on the control information, that the data is to be transmitted or received according to the first transmission scheme and according to the DPS configuration.

Example 208: a non-transitory, computer-readable storage medium includes the non-transitory, computer-readable storage medium of Example 207. Further, the control information further includes an indication of a number of repetitions by which to transmit the data, the number of repetitions being equal to one, and the UE device determines, based on the control information, that the data is to be transmitted or received according to the first transmission scheme and according to the DPS configuration.

Example 209: a non-transitory, computer-readable storage medium includes the non-transitory, computer-readable storage medium of Example 205. Further, the control information indicates that the second transmission scheme, one TCI state, and one or more CDM groups are associated with the transmission, and the UE device determines, based on the control information, that the data is to be transmitted or received according to the second transmission scheme and according to the DPS configuration.

Example 210: a non-transitory, computer-readable storage medium includes the non-transitory, computer-readable storage medium of Example 209. Further, he control information further includes an indication of a number of repetitions by which to transmit the data, the number of repetitions being greater than one, and the UE device determines, based on the control information, that the data is to be transmitted or received according to the second transmission scheme and according to the DPS configuration.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device comprising:

one or more processors; and memory storing instructions that when executed by the one or more processors, cause the UE device to perform operations comprising:

receiving, by the UE device, control information regarding a transmission to a wireless network, the control information comprising:

an indication of a number of transmission configuration indication (TCI) states associated with the transmission, an indication of a number of code division multiplexing (CDM) groups associated with the transmission, and an indication of a number of repetitions by which the transmission is transmitted, wherein the number of repetitions is selected from a set of numbers including one; and transmitting, by the UE device based on the control information, multiple repetitions of the transmission according to a dynamic point selection (DPS) configuration.

2. The UE device of claim 1, wherein transmitting the multiple repetitions of the transmission according to the DPS configuration comprises:

selecting, by the UE device, a base station from among a plurality of base stations of the wireless network based on one or more quality metrics;

generating, by the UE device using one or more antenna arrays, a beam directed to the selected base station; and transmitting, by the UE device, the multiple repetitions of the transmission to the selected base station using the beam.

3. The UE device of claim 1, wherein the multiple repetitions of the transmission are transmitted within a same slot with respect to a time domain.

4. The UE device of claim 1, wherein the multiple repetitions of the transmission are transmitted during different respective slots with respect to a time domain.

5. The UE device of claim 1, wherein transmitting the multiple repetitions of the transmission according to the DPS configuration comprises:

transmitting the transmission in a first repetition according to a first TCI state associated with the transmission, and transmitting the transmission in a second repetition according to a second TCI state associated with the transmission.

6. A base station comprising:

one or more processors; and memory storing instructions that when executed by the one or more processors, cause the base station to perform operations comprising:

transmitting, from the base station to a user equipment (UE) device, control information regarding a transmission to a wireless network, the control information comprising:

an indication of a number of transmission configuration indication (TCI) states associated with the transmission, an indication of a number of code division multiplexing (CDM) groups associated with the transmission, and an indication of a number of repetitions by which the transmission is transmitted, wherein the number of repetitions is selected from a set of numbers including one; and receiving, at the base station from the UE device over the wireless network, multiple repetitions of the transmission according to a dynamic point selection (DPS) configuration.

7. The base station of claim 6, wherein receiving the multiple repetitions of the transmission according to the DPS configuration comprises:

receiving the multiple repetitions of the transmission using a beam directed to the base station, wherein the beam is generated by the UE device using one or more antenna arrays.

8. The base station of claim 6, wherein the multiple repetitions of the transmission are received within a same slot with respect to a time domain.

9. The base station of claim 6, wherein the multiple repetitions of the transmission are received during different respective slots with respect to a time domain.

10. The base station of claim 6, wherein receiving the multiple repetitions of the transmission according to the DPS configuration comprises:

receiving the transmission in a first repetition according to a first TCI state associated with the transmission, and receiving the transmission in a second repetition according to a second TCI state associated with the transmission.

11. Baseband circuitry of a user equipment (UE), wherein the baseband circuitry is configured to:

receive control information regarding a transmission to a wireless network, the control information comprising:

an indication of a number of transmission configuration indication (TCI) states associated with the transmission, an indication of a number of code division multiplexing (CDM) groups associated with the transmission, and an indication of a number of repetitions by which the transmission is transmitted, wherein the number of repetitions is selected from a set of numbers including one; and instruct, based on the control information, radio frequency (RF) circuitry to transmit multiple repetitions of the transmission according to a dynamic point selection (DPS) configuration.

12. The baseband circuitry of claim 11, wherein instructing the RF circuitry to transmit the multiple repetitions of the transmission according to the DPS configuration comprises:

selecting a base station from among a plurality of base stations of the wireless network based on one or more quality metrics;

causing one or more antenna arrays to generate a beam directed to the selected base station; and causing the RF circuitry to transmit the multiple repetitions of the transmission to the selected base station using the beam.

13. The baseband circuitry of claim 11, wherein the RF circuitry is caused to transmit the multiple repetitions of the transmission within a same slot with respect to a time domain.

14. The baseband circuitry of claim 11, wherein the RF circuitry is caused to transmit the multiple repetitions of the transmission during different respective slots with respect to a time domain.

15. The baseband circuitry of claim 11, wherein instructing the RF circuitry to transmit the multiple repetitions of the transmission according to the DPS configuration comprises:

causing the transmission to be transmitted in a first repetition according to a first TCI state associated with the transmission, and causing the transmission to be transmitted in a second repetition according to a second TCI state associated with the transmission.

* * * * *